US012640044B2

(12) United States Patent
Soryal et al.

(10) Patent No.: US 12,640,044 B2
(45) Date of Patent: May 26, 2026

(54) DUAL-MODE VEHICLE COLLECTIVE GUIDANCE SYSTEMS

(71) Applicant: AT&T Intellectual Property I, L.P., Atlanta, GA (US)

(72) Inventors: Joseph Soryal, Glendale, NY (US); Naila Jaoude, Eatontown, NJ (US); Christina Cacioppo, Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 542 days.

(21) Appl. No.: 17/548,911

(22) Filed: Dec. 13, 2021

(65) Prior Publication Data

US 2023/0186779 A1     Jun. 15, 2023

(51) Int. Cl.
*G08G 7/00*          (2006.01)
*B60F 5/02*          (2006.01)
(Continued)

(52) U.S. Cl.
CPC ................ *G08G 7/00* (2013.01); *B60F 5/02* (2013.01); *B64C 37/00* (2013.01); *G01C 21/365* (2013.01);
(Continued)

(58) Field of Classification Search
CPC .. G08G 7/00; G08G 7/02; G08G 1/00; G08G 1/09; G08G 1/0962; G08G 1/0965; G08G 1/0968; G08G 1/096855; G08G 5/00; G08G 5/0004; G08G 5/0017; G08G 5/0073; G08G 5/0091; G08G 5/0013;

G08G 5/0026; G08G 5/0043; G08G 5/0047; G08G 5/0069; G08G 5/0082; B60F 5/00; B60F 5/02;
(Continued)

(56) References Cited

U.S. PATENT DOCUMENTS

2016/0290817 A1* 10/2016 Hoogland ............ G01C 23/005
2018/0045522 A1*  2/2018 Aziz ...................... B64U 30/26
(Continued)

OTHER PUBLICATIONS

AeroMobil attended Viva Technology 2019 the world's rendezvous for startups and leaders in Paris. (n.d.) Retrieved from https://press.aeromobil.com/aeromobil-attended-viva-technology-2019-the-worlds-rendezvous-for-startups-and-leaders-in-paris.
(Continued)

*Primary Examiner* — Khoi H Tran
*Assistant Examiner* — Sarah A Tran

(57) ABSTRACT

A processing system including at least one processor executing a traffic management application may detect a proximity to a traffic zone for vehicular traffic, the dual-mode vehicle having two modes of operation, the two modes of operation comprising a surface mode of operation and an aerial mode of operation, and may verify a rule set for vehicular operations within the traffic zone. The processing system may then identify a leader traffic management application from among a plurality of traffic management applications of a plurality of dual-mode vehicles within or near the traffic zone, obtain at least one navigation instruction from the leader traffic management application, and perform at least one of: executing a navigation action in accordance with the at least one navigation instruction, or displaying at least a portion of a permitted route that is in conformance with the at least one navigation instruction.

20 Claims, 5 Drawing Sheets

(51) Int. Cl.

| | |
|---|---|
| *B64C 37/00* | (2006.01) |
| *G01C 21/36* | (2006.01) |
| *G08G 1/0965* | (2006.01) |
| *G08G 1/0968* | (2006.01) |
| *G05D 1/00* | (2006.01) |

(52) U.S. Cl.
CPC ..... *G08G 1/0965* (2013.01); *G08G 1/096855* (2013.01); *G05D 1/0212* (2013.01); *G05D 1/101* (2013.01)

(58) Field of Classification Search
CPC ......... B64C 37/00; B64C 37/02; G01C 21/00; G01C 21/26; G01C 21/34; G01C 21/36; G01C 21/3626; G01C 21/365; G05D 1/0212; G05D 1/101
USPC ....................................................... 701/117
See application file for complete search history.

(56) References Cited

U.S. PATENT DOCUMENTS

| | | | | |
|---|---|---|---|---|
| 2018/0122237 | A1* | 5/2018 | Nascimento ..... | G08G 1/096758 |
| 2018/0181095 | A1* | 6/2018 | Funk ................... | G05B 19/042 |
| 2022/0335841 | A1* | 10/2022 | Huncha ................... | G08G 5/76 |

OTHER PUBLICATIONS

Bekmezci, I, et al., "Flying Ad-Hoc Networks (FANETs): A Survey", Ad Hoc Networks, vol. 11, Issue 3, May 2013, pp. 1254-1270.

\* cited by examiner

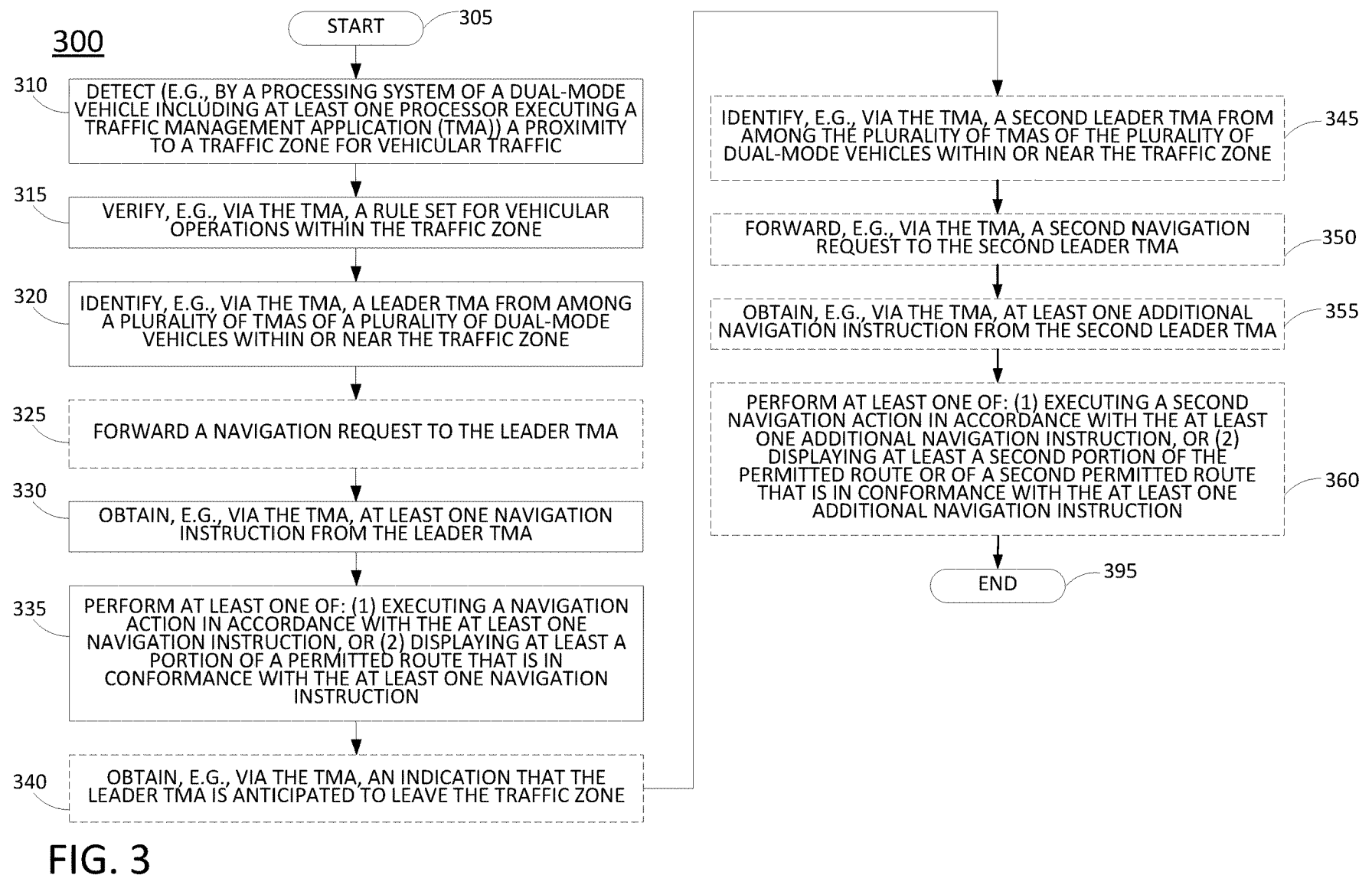

300

START — 305

310 — DETECT (E.G., BY A PROCESSING SYSTEM OF A DUAL-MODE VEHICLE INCLUDING AT LEAST ONE PROCESSOR EXECUTING A TRAFFIC MANAGEMENT APPLICATION (TMA)) A PROXIMITY TO A TRAFFIC ZONE FOR VEHICULAR TRAFFIC

315 — VERIFY, E.G., VIA THE TMA, A RULE SET FOR VEHICULAR OPERATIONS WITHIN THE TRAFFIC ZONE

320 — IDENTIFY, E.G., VIA THE TMA, A LEADER TMA FROM AMONG A PLURALITY OF TMAS OF A PLURALITY OF DUAL-MODE VEHICLES WITHIN OR NEAR THE TRAFFIC ZONE

325 — FORWARD A NAVIGATION REQUEST TO THE LEADER TMA

330 — OBTAIN, E.G., VIA THE TMA, AT LEAST ONE NAVIGATION INSTRUCTION FROM THE LEADER TMA

335 — PERFORM AT LEAST ONE OF: (1) EXECUTING A NAVIGATION ACTION IN ACCORDANCE WITH THE AT LEAST ONE NAVIGATION INSTRUCTION, OR (2) DISPLAYING AT LEAST A PORTION OF A PERMITTED ROUTE THAT IS IN CONFORMANCE WITH THE AT LEAST ONE NAVIGATION INSTRUCTION

340 — OBTAIN, E.G., VIA THE TMA, AN INDICATION THAT THE LEADER TMA IS ANTICIPATED TO LEAVE THE TRAFFIC ZONE

345 — IDENTIFY, E.G., VIA THE TMA, A SECOND LEADER TMA FROM AMONG THE PLURALITY OF TMAS OF THE PLURALITY OF DUAL-MODE VEHICLES WITHIN OR NEAR THE TRAFFIC ZONE

350 — FORWARD, E.G., VIA THE TMA, A SECOND NAVIGATION REQUEST TO THE SECOND LEADER TMA

355 — OBTAIN, E.G., VIA THE TMA, AT LEAST ONE ADDITIONAL NAVIGATION INSTRUCTION FROM THE SECOND LEADER TMA

360 — PERFORM AT LEAST ONE OF: (1) EXECUTING A SECOND NAVIGATION ACTION IN ACCORDANCE WITH THE AT LEAST ONE ADDITIONAL NAVIGATION INSTRUCTION, OR (2) DISPLAYING AT LEAST A SECOND PORTION OF THE PERMITTED ROUTE OR OF A SECOND PERMITTED ROUTE THAT IS IN CONFORMANCE WITH THE AT LEAST ONE ADDITIONAL NAVIGATION INSTRUCTION

END — 395

FIG. 3

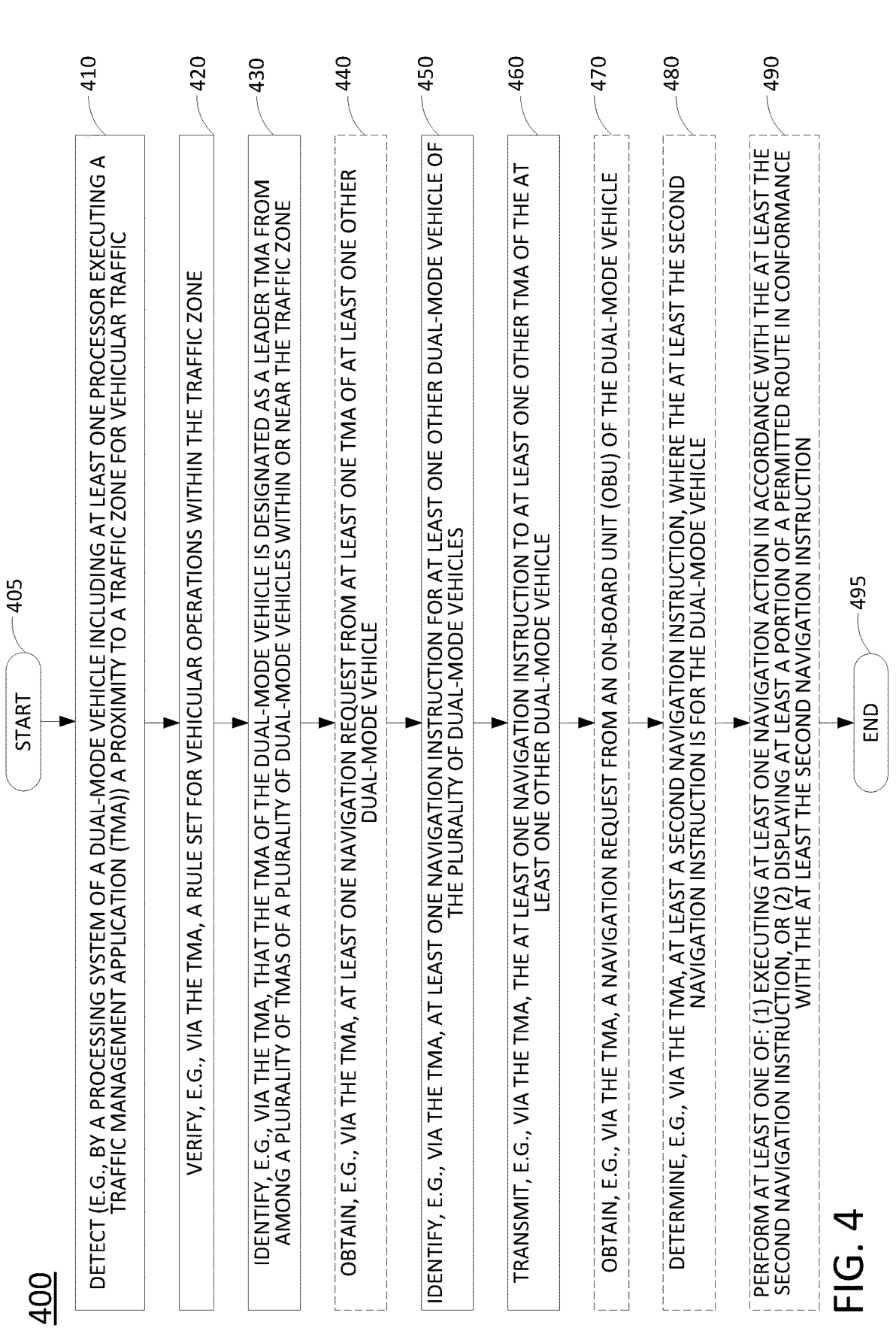

400

START — 405

DETECT (E.G., BY A PROCESSING SYSTEM OF A DUAL-MODE VEHICLE INCLUDING AT LEAST ONE PROCESSOR EXECUTING A TRAFFIC MANAGEMENT APPLICATION (TMA)) A PROXIMITY TO A TRAFFIC ZONE FOR VEHICULAR TRAFFIC — 410

VERIFY, E.G., VIA THE TMA, A RULE SET FOR VEHICULAR OPERATIONS WITHIN THE TRAFFIC ZONE — 420

IDENTIFY, E.G., VIA THE TMA, THAT THE TMA OF THE DUAL-MODE VEHICLE IS DESIGNATED AS A LEADER TMA FROM AMONG A PLURALITY OF TMAS OF A PLURALITY OF DUAL-MODE VEHICLES WITHIN OR NEAR THE TRAFFIC ZONE — 430

OBTAIN, E.G., VIA THE TMA, AT LEAST ONE NAVIGATION REQUEST FROM AT LEAST ONE TMA OF AT LEAST ONE OTHER DUAL-MODE VEHICLE — 440

IDENTIFY, E.G., VIA THE TMA, AT LEAST ONE NAVIGATION INSTRUCTION FOR AT LEAST ONE OTHER DUAL-MODE VEHICLE OF THE PLURALITY OF DUAL-MODE VEHICLES — 450

TRANSMIT, E.G., VIA THE TMA, THE AT LEAST ONE NAVIGATION INSTRUCTION TO AT LEAST ONE OTHER TMA OF THE AT LEAST ONE OTHER DUAL-MODE VEHICLE — 460

OBTAIN, E.G., VIA THE TMA, A NAVIGATION REQUEST FROM AN ON-BOARD UNIT (OBU) OF THE DUAL-MODE VEHICLE — 470

DETERMINE, E.G., VIA THE TMA, AT LEAST A SECOND NAVIGATION INSTRUCTION, WHERE THE AT LEAST THE SECOND NAVIGATION INSTRUCTION IS FOR THE DUAL-MODE VEHICLE — 480

PERFORM AT LEAST ONE OF: (1) EXECUTING AT LEAST ONE NAVIGATION ACTION IN ACCORDANCE WITH THE AT LEAST THE SECOND NAVIGATION INSTRUCTION, OR (2) DISPLAYING AT LEAST A PORTION OF A PERMITTED ROUTE IN CONFORMANCE WITH THE AT LEAST THE SECOND NAVIGATION INSTRUCTION — 490

END — 495

FIG. 4

DUAL-MODE VEHICLE COLLECTIVE GUIDANCE SYSTEMS

The present disclosure relates generally to dual-mode vehicle operations, and more particularly to methods, computer-readable media, and apparatuses for identifying that a traffic management application of a dual-mode vehicle is designated as a leader traffic management application within or near a traffic zone and transmitting via the traffic management application of the dual-mode vehicle a navigation instruction to at least one other traffic management application of at least one other dual-mode vehicle, and to methods, computer-readable media, and apparatuses for obtaining via a traffic management application of a dual-mode vehicle a navigation instruction from a leader traffic management application and performing at least one of executing a navigation action or displaying at least a portion of a permitted route that is in conformance with the navigation instruction.

BACKGROUND

Safety concerns pertaining to the simultaneous operations of different types of vehicles, such as traditional cars and remote and/or self-operating vehicles, or the like, are drawing attention as government and regulatory entities debate frameworks for managing this developing area. However, safe operation may remain entirely within the calculus of a human operator or of an on-board computing system that is operating the vehicle. In addition, as dual-mode vehicles (or "flying cars" with a ground/surface operating mode and a flying/aerial operating mode) may become more widely available, these dual-mode vehicles may coexist with conventional motor vehicles (e.g., single-mode vehicles for surface operation, or surface-operating vehicles, including internal combustion engine-powered vehicles, electric/battery powered vehicles, and hybrid vehicles) for some time, which may result in various challenges.

SUMMARY

In one example, the present disclosure describes a method, computer-readable medium, and apparatus for identifying that a traffic management application of a dual-mode vehicle is designated as a leader traffic management application within or near a traffic zone and transmitting via the traffic management application of the dual-mode vehicle a navigation instruction to at least one other traffic management application of at least one other dual-mode vehicle. For instance, in one example, a processing system including at least one processor executing a traffic management application may detect a proximity to a traffic zone for vehicular traffic, the dual-mode vehicle having two modes of operation, where the two modes of operation comprise a surface mode of operation and an aerial mode of operation, and may verify a rule set for vehicular operations within the traffic zone. The processing system may then identify a leader traffic management application from among a plurality of traffic management applications of a plurality of dual-mode vehicles within or near the traffic zone, where the plurality of dual-mode vehicles includes the dual-mode vehicle, obtain at least one navigation instruction from the leader traffic management application, and perform at least one of: executing a navigation action in accordance with the at least one navigation instruction, or displaying at least a portion of a permitted route that is in conformance with the at least one navigation instruction.

In another example, the present disclosure describes a method, computer-readable medium, and apparatus for obtaining via a traffic management application of a dual-mode vehicle a navigation instruction from a leader traffic management application and performing at least one of executing a navigation action or displaying at least a portion of a permitted route that is in conformance with the navigation instruction. For instance, in one example, a processing system including at least one processor executing a traffic management application may detect a proximity to a traffic zone for vehicular traffic, the dual-mode vehicle having two modes of operation, wherein the two modes of operation comprise a surface mode of operation and an aerial mode of operation, and may verify a rule set for vehicular operations within the traffic zone. The processing system may then identify that the traffic management application of the dual-mode vehicle is designated as a leader traffic management application from among a plurality of traffic management applications of a plurality of dual-mode vehicles within or near the traffic zone, identify at least one navigation instruction for at least one other dual-mode vehicle of the plurality of dual-mode vehicles, and transmit the at least one navigation instruction to at least one other traffic management application of the at least one other dual-mode vehicle.

BRIEF DESCRIPTION OF THE DRAWINGS

The teaching of the present disclosure can be readily understood by considering the following detailed description in conjunction with the accompanying drawings, in which:

FIG. 3 illustrates a flowchart of an example method for identifying that a traffic management application of a dual-mode vehicle is designated as a leader traffic management application within or near a traffic zone and transmitting via the traffic management application of the dual-mode vehicle a navigation instruction to at least one other traffic management application of at least one other dual-mode vehicle, in accordance with the present disclosure;

FIG. 4 illustrates a flowchart of an example method for obtaining via a traffic management application of a dual-mode vehicle a navigation instruction from a leader traffic management application and performing at least one of: executing a navigation action or displaying at least a portion of a permitted route that is in conformance with the navigation instruction, in accordance with the present disclosure.

To facilitate understanding, identical reference numerals have been used, where possible, to designate identical elements that are common to the figures.

DETAILED DESCRIPTION

Figure 1:
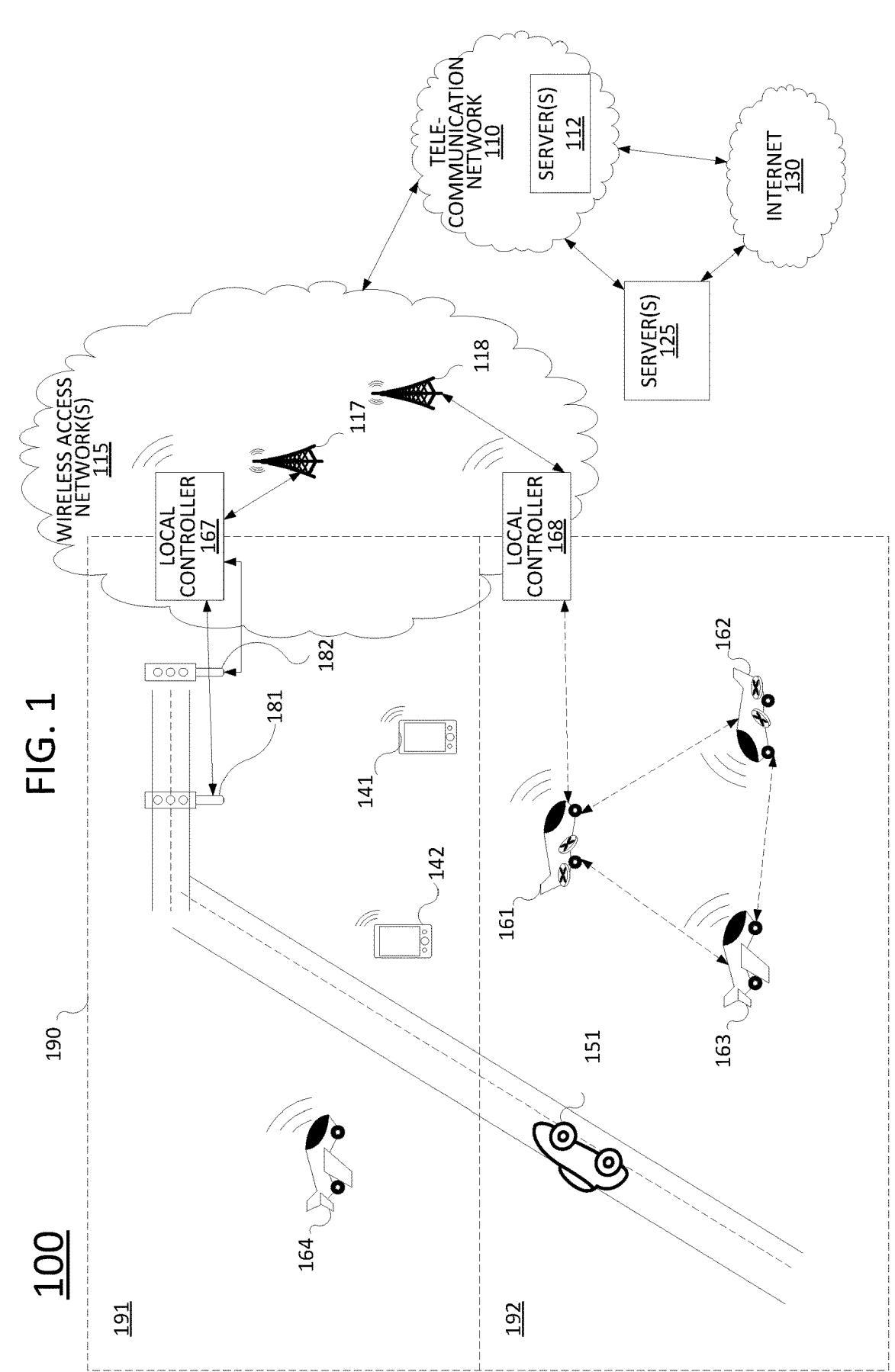
FIG. 1 illustrates an example system related to the present disclosure.

The present disclosure broadly discloses methods, computer-readable media, and apparatuses for identifying that a traffic management application of a dual-mode vehicle is designated as a leader traffic management application within or near a traffic zone and transmitting via the traffic management application of the dual-mode vehicle a navigation instruction to at least one other traffic management application of at least one other dual-mode vehicle. The present disclosure also broadly discloses methods, computer-readable media, and apparatuses for obtaining via a traffic management application of a dual-mode vehicle a navigation instruction from a leader traffic management application and performing at least one of executing a navigation action or displaying at least a portion of a permitted route that is in conformance with the navigation instruction. In particular, examples of the present disclosure provide for a distributed traffic control coordination process for dual-mode vehicles (e.g., flying cars) for safety and traffic efficiency. In one example, navigation instructions may cause a holographic presentation of a route to be overlaid on a three-dimensional model or representation of an area (broadly a "traffic zone") to notify an operator of a dual-mode vehicle when to proceed and when to stop, where to navigate, or where it is permitted and/or not permitted to navigate, and so forth. Alternatively, or in addition, for autonomous dual-mode vehicles (or for dual-mode vehicles in a self-operating mode), navigation instructions may be provided to a controller of the dual-mode vehicle to cause the dual-mode vehicle to execute at least one navigation operation/maneuver, e.g., to proceed, stop, slow, accelerate, yield, change altitude, or the like.

As referred to herein a dual-mode vehicle may comprise a vehicle that has two modes of operation: a surface mode of operation and an aerial mode of operation. Such a dual-mode vehicle may also be referred to as a "flying car." In the surface mode of operation, the dual-mode vehicle may operate as a conventional surface-operating vehicle (e.g., an internal combustion engine-powered vehicle, electric/battery powered vehicle, or hybrid vehicle) that is equipped to comply with and follow all relevant laws and regulations regarding surface-based vehicular operation on roads, highways, or other rights-of-way in a relevant jurisdiction. For instance, the dual-mode vehicle may include left and right turn signals, and brake signals. The dual-mode vehicle may include headlights, taillights, a horn, and other equipment as required by law or regulation, in addition to having a size/dimensions to permit the dual-mode vehicle to operate within the lanes or other traffic markings of the roads, highways, or other rights-of-way in the relevant jurisdiction.

As referred to herein, a dual-mode vehicle is also equipped for aerial operation. For instance, the dual-mode vehicle may include one or more propellers, turbofans, jet engines, or rotors, wings, a tail, ailerons, a tail rotor, etc., and may be designed for forward-take-off-and-landing (FTOL) or vertical-take-off-and-landing (VTOL). In one example, the dual-mode vehicle may have retractable wings, rotors, and/or other components that may be extended or retracted for aerial mode operation or surface mode operation, respectively. As with the surface mode of operation, the dual-mode vehicle may be equipped to comply with and follow all relevant laws and regulations regarding aerial vehicular operation in a relevant jurisdiction. In addition, for both modes of operation, the dual-mode vehicle may include automated and/or operator assist functionality, such as for surface mode operations: lane sensing/lane maintenance capability and/or lane departure warning, following distance capability, automatic braking and/or crash avoidance capability, and so forth. Similarly, for aerial mode operations, the automated and/or operator assist functionality may include: flight path maintenance, speed maintenance, heading/bearing maintenance, yaw, pitch, and/or roll maintenance, altitude maintenance, etc., warnings for any one or more of the above (e.g., a low altitude warning, an altitude change warning, a stall warning, etc.), and so forth.

It is anticipated that dual-mode vehicles may coexist with conventional automobiles for some time, raising a variety of challenges and risks. For instance, a dual-mode vehicle may need to know the conditions as to when and where to take-off and land, which may be affected by federal/national laws, rules, regulations, and/or policies (e.g., allowed areas, restricted areas, road conditions, etc.), state and/or local laws, rules, regulations, and/or policies (e.g., allowed areas, restricted areas, road conditions, etc.), manufacturer guidelines (e.g., for weather, road geometry, other vehicles in the vicinity, road material, etc.), the presence of other dual-mode vehicles, user factors (e.g., license, experience, health status, etc.), the presence of conventional aircraft in the vicinity, the rights of way of conventional aircraft and/or conventional surface-based vehicles, and so forth.

As dual-mode vehicles become more accessible and may coexist with regular ground-based vehicles, in accordance with the present disclosure dual-mode vehicles may coordinate amongst themselves while airborne to establish rights-of-way, to maintain traffic flow, to ensure safety margins while crossing paths or when otherwise in the vicinity of each other, and so forth. In addition, dual-mode vehicles may also coordinate with ground traffic controllers especially during landing and taking off on roads or other navigable surfaces that are shared with other ground-based vehicles. For instance, in one example, the present disclosure may include a local controller (LC) that grants or denies permissions for dual-mode vehicles to take-off and land. The local controller may determine whether to permit or deny a transition between modes of operation (e.g., take-off or land) based upon: geographical location, road conditions, which in one example, may be determined from sensors and/or vehicles at or near the geographic location in communication with and accessible to the local controller (e.g., rain, ice, traffic density, traffic speed, etc.), weather conditions, which may similarly be determined from sensors and/or vehicles in communication with the local controller, time of the day, day of the week, time of year, etc. (for instance, 8:00 AM take-off may be allowed on weekdays but not on weekends), operator qualifications, capabilities of dual-mode vehicles, any fees associated with landing and/or taking-off, such as determined by governmental or regulatory authorities, and so on. In one example, the local controller may also pull data and policies from different places (following federal, local, and manufacturer's guidelines) and provide a decision to a dual-mode vehicle to permit or deny either landing or taking off at a requested location. In accordance with the present disclosure, when the decision is to deny the request, the local controller may also determine an alternate location, e.g., another nearby road, where the local controller determines that the conditions are able to permit the taking off or landing by the dual-mode vehicle.

Thus, in order for a dual-mode vehicle to convert itself to aerial mode, the local controller must agree and provide a permission. In one example, any violations may be reported to a penalty and enforcement system and/or relevant authorities for appropriate action. The local controller may also monitor other operations (e.g., aerial mode operations and/or surface-based operations) to ensure that the dual-mode vehicle complies with any laws, rules, regulations, or policies that are in effect. For instance, it may be required that manufacturers equip dual-mode vehicles to report operational data to local controllers as part of a registration/certification process. In addition, operators of dual-mode vehicles may be required to maintain such functionality of the dual-mode vehicles in order to continue to be permitted to operate the dual-mode vehicles in any capacity. In this regard, in one example, the local controller may be connected with a central control system, or policy manager, for updates and error-free operation (e.g., within a given region that includes a plurality of local controllers that are assigned to areas within the region, broadly "traffic zones"). In addition, in one example, local controllers within the region may communicate and coordinate amongst themselves and with the policy manager. For instance, as noted above, when a local controller (e.g., a first local controller) determines to deny a request to transition between modes of operation, the first local controller may also determine an alternate location where the conditions are more ideal to permit the taking off or landing by the dual-mode vehicle. In such case, the first local controller may determine the alternate location within its own area to which it is assigned, or may determine the alternate location in a nearby area that is assigned to another local controller (e.g., a second local controller), where the first local controller may communicate and coordinate with the second local controller to confirm the availability of the alternate location and to indicate that the requested transition is permitted at such alternate location.

Accordingly, in one example, the local controller may be connected to all vehicles in the assigned area (e.g., aerial vehicles, surface-based vehicles, dual-mode vehicles on the ground and in the air, etc.) and may coordinate among all of such vehicles to grant permissions to dual-mode vehicles to transition between modes of operation (e.g., to take-off and land). In one example, the policy manager keeps records for all dual-mode vehicles and operator profiles up to date. When a dual-mode vehicle is in transit (including aerial and surface-based movements), other local controllers on the route may track the dual-mode vehicle and may relay information regarding the location (e.g., including altitude, if applicable), speed, etc. to enable a local controller handling a request to transition modes of operation to determine compliance of the dual-mode vehicle with any decision (e.g., did the dual-mode vehicle simply land or take-off somewhere without permission?).

In one example, a routing module of the local controller or the policy manager, or such entities in coordination with one another, may optimize the distance/timing between flying and driving between two points for a dual-mode vehicle. The local controller may provide the operator and/or the dual-mode vehicle with this information. For instance, an operator may be leaving home and intending to travel to work. The aerial mode of operation may be preferred to the extent possible due to the ability to more quickly cover a greater distance and avoid traffic. The operator may enter a route and/or intended destination into a navigation system of the dual-mode vehicle via a user interface. In addition, the operator may indicate a requested location to transition to aerial mode. The dual-mode vehicle (e.g., via the navigation system thereof) may submit the navigation plan/request to the local controller for the area. The local controller may determine that the take-off at the requested location is not available, but that take-off is available at several nearby locations (e.g., the next street over to the north, two blocks east and one block south, an empty road one mile away, etc.). In such case, the local controller, or the local controller in conjunction with other local controllers and/or the policy manager may determine from among several options, which may assist the operator in reaching the destination earliest.

It should be noted that a similar process may be followed with respect to obtaining/granting a permission to land. For instance, an operator may navigate a dual-mode vehicle towards a destination in aerial mode without having a specific permission to land at a requested location. In one example, as the dual-mode vehicle approaches an intended destination, the dual-mode vehicle may communicate the intended destination as a "requested location" to land (e.g., by messaging the local controller assigned to an area including the destination). In such case, the local controller may apply the same or similar factors as discussed above, e.g., weather conditions, aerial and surface-based traffic, time of day, day of week, or other restrictions, fuel level, engine status, and so forth, to determine whether to permit or deny the landing at the requested location (e.g., the destination as indicated in the navigation plan). Again, in the case that the transition is not permitted at the requested location, the local controller may determine an alternate location where the transition (landing) may be permitted. In each case, whether permission is granted for the requested location or an alternate location is offered, the local controller may request that the dual-mode vehicle provide a confirmation (e.g., acceptance or denial) of the permission and/or offer.

In one example, the present disclosure may include a plurality of dual-mode vehicles (e.g., including of various makes and models), each equipped with a traffic management application (TMA) that resides on the dual-mode vehicle's computing hardware and that coordinates aerial maneuvers and aerial traffic flow of airborne dual-mode vehicles within a traffic zone in an autonomous, distributed, and intelligent way. In one example, prior to a dual-mode vehicle taking off within a traffic zone or entering the traffic zone in an aerial mode of operation, the dual-mode vehicle may be required to provide a verification that the dual-mode vehicle is equipped with a latest (or sufficiently up-to-date) TMA and also has a requisite rule set for vehicular operations within the traffic zone (e.g., including rules for dual-mode vehicle aerial operations within the traffic zone).

To illustrate, in one example, a dual-mode vehicle may run the TMA application via a secret hashing algorithm provided by a local controller for the traffic zone. A resultant hash may be required to match what is expected by the local controller, which may have the latest secure copy of the TMA. It should be noted that the TMA may comprise an isolated application that works independently from the dual-mode vehicle in which the TMA is installed. In accordance with the present disclosure, each TMA may be configured to serve the collective benefit of the entire ecosystem (e.g., all dual-mode vehicles in the traffic zone) to provide fair and safe traffic regulation. In other words, no TMA is to favor its hosting car. In one example, TMAs of dual-mode vehicles in a traffic zone (e.g., those in aerial operation or which will transition to aerial mode of operation within a defined period of time (e.g., within no later than the next two minutes, the next five minutes, etc.)) may participate to select a leader TMA for the traffic zone. In one example, the designation of a leader TMA may be for a fixed period of time, e.g., for at least 30 seconds, for at least one minute, at least two minutes, at least five minutes, etc., may be for an expected period of time that a dual-mode vehicle in which a leader TMA is installed is expected to stay within the traffic zone, etc.

In one example, all TMA instances on multiple dual-mode vehicles assign ranks in a hierarchy that could last for a few seconds up to several minutes.

In addition, the TMA instances may share these ranks with each other and collectively sum the individual ranks (e.g., collective voting). The TMA with highest score may thus be designated as the leader TMA. In one example, when a dual-mode vehicle having a TMA with higher rank leaves the physical area, a second-in-line TMA may take over. In another example, re-voting may occur in advance of the anticipated exit of the dual-mode vehicle with a current leader TMA leaving the traffic zone. It should also be noted that these operations may be invisible to the hosting dual-mode vehicles and/or any operators thereof for security and to eliminate preference manipulation and distraction in vehicle operation.

If a dual-mode vehicle is visiting a new area and does not have the latest TMA or does not have a current rule set for vehicular operations within the traffic zone, a leader TMA or a local controller can send the TMA and/or rule set to be installed on an approaching dual-mode vehicle to enable the dual-mode vehicle to enter and safely operate within the traffic zone. TMAs of dual-mode vehicles within or near the traffic zone (e.g., in an adjacent traffic zone), may communicate peer-to-peer with each other. In one example, dual-mode vehicles may communicate intended navigation paths and/or intended maneuvers/operations to the leader TMA via respective TMAs within each dual-mode vehicle. In one example, other modules within each dual-mode vehicle, such as a navigation system/module may communicate with the on-board TMA, where the TMA may then communicate remotely with the leader TMA. The leader TMA may then grant or deny permission to engage in maneuvers/operations, may grant or deny authorization for intended navigation paths, may provide instructions for alternate maneuvers/operations and/or navigation paths, and so forth. In one example, a leader TMA may provide instructions, assign priorities, and/or may notify of acceptable maneuvers, such as assigning passing priorities (e.g., green light/proceed signal to dual-mode vehicles proceeding in certain direction(s), stop/hold signals for other dual-mode vehicles, acceptable altitude ranges, etc.). In one example, a leader TMA may be aware of first responder dual-mode vehicles and may grant such first responder dual-mode vehicles preemptive permission to pass or engage in other aerial maneuvers/operations.

In one example, dual-mode vehicles may coordinate with a local controller of an area/traffic zone, in particular, for landing and taking off. For instance, the TMAs of dual-mode vehicles in the traffic zone or dual-mode vehicles intending to enter the traffic zone may connect to a local controller via 5G device-to-device, or other wireless communications using one or more local controller application programming interfaces (APIs). As noted above, the local controller may grant permissions and timings to take-off and land within a traffic zone. In one example, the local controller may receive requests and communicate responses granting or denying permission to the dual-mode vehicles seeking to engage in such take-offs and landings. Alternatively, or in addition, the leader TMA may receive such requests, forward such requests to the local controller, receive responses, and forward the responses to the respective dual-mode vehicles. In still another example, a requesting dual-mode vehicle may communicate with the local controller and may receive a response granting or denying a request to take-off or land, while the local controller may also notify the leader TMA. Thus, for example, the leader TMA may use this information to grant or deny requests of other dual-mode vehicles in the vicinity based upon the take-off and/or landing approvals (or denials). For instance, if a local controller has granted landing permission to a first dual-mode vehicle to land at a particular location in the traffic zone, any other dual-mode vehicles having intended navigation paths and/or maneuvers that would be near the landing location may be de-prioritized, such as by instructing these dual-mode vehicles to slow down so as to not arrive in the vicinity at the same time as the intended landing, rerouting these dual-mode vehicles away from the intended landing location and/or to other altitudes, and so forth. It is again noted that the local controller may coordinate with ground-based vehicles, traffic signals, etc. so as to provide a clear landing for the first dual-mode vehicle. These and other aspects of the present disclosure are discussed in greater detail below in connection with the examples of FIGS. 1-5.

To aid in understanding the present disclosure, FIG. 1 illustrates an example system 100, related to the present disclosure. As shown in FIG. 1, the system 100 connects mobile devices 141 and 142, server(s) 112, server(s) 125, surface vehicle 151, dual-mode vehicles 161-164, local controllers 167 and 168, and so forth with one another and with various other devices via a core network, e.g., a telecommunication network 110, a wireless access network 115 (e.g., a cellular network), and Internet 130.

In one example, the system 100 includes a telecommunication network 110. In one example, telecommunication network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication network 110 uses a network function virtualization infrastructure (NFVI), e.g., host devices or servers that are available as host devices to host virtual machines comprising virtual network functions (VNFs). In other words, at least a portion of the telecommunication network 110 may incorporate software-defined network (SDN) components.

In one example, one or more wireless access networks 115 may each comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network(s) 115 may each comprise an access network in accordance with any "second generation" (2G), "third generation" (3G), "fourth generation" (4G), Long Term Evolution (LTE), "fifth generation" (5G), or any other existing or yet to be developed future wireless/cellular network technology. While the present disclosure is not limited to any particular type of wireless access network, in the illustrative example, base stations 117 and 118 may each comprise a Node B, evolved Node B (eNodeB), or gNodeB (gNB), or any combination thereof providing a multi-generational/multi-technology-capable base station.

In the present example, wireless access network(s) 115 may include local controllers (LCs) 167 and 168. In addition, as illustrated in FIG. 1, local controllers 167 and 168 may be assigned to areas 191 and 192, respectively, in region 190. In accordance with the present disclosure, these areas 191 and 192 may also be referred to as "traffic zones." In one example, each of the local controllers 167 and 168 may be associated with a respective base station 117 and 118 (e.g., a gNB). In such an example, local controllers 167 and 168 may communicate with dual-mode vehicles 161-164 via the respective base stations 117 and 118. In one example, local controllers 167 and 168 may also obtain information from surface vehicle 151, mobile devices 141 and 142, and so forth, via base stations 117 and 118.

In the present example, mobile devices 141 and 142, dual-mode vehicles 161-164, and surface vehicle 151, may be in communication with base stations 117 and 118, which may provide connectivity between dual-mode vehicles 161-164, surface vehicle 151, mobile devices 141 and 142, and other endpoint devices within the system 100, various network-based devices, such as local controllers 167 and 168, server(s) 112, server(s) 125, and so forth. In one example, wireless access network(s) 115 may be operated by the same service provider that is operating telecommunication network 110, or one or more other service providers.

In another example, each of local controllers 167 and 168 may comprise a base station for cellular and/or non-cellular wireless communication (e.g., a picocell, femtocell, or the like). For instance, local controllers 167 and 168 may be equipped with antenna and radio infrastructures such as multiple input multiple output (MIMO) antennas, and millimeter wave antennas. In this regard, the footprint or coverage area of local controllers 167 and 168, may in some instances be smaller than the coverage provided by NodeBs or eNodeBs of 3G-4G RAN infrastructure. For example, the coverage of local controllers 167 and 168 utilizing one or more millimeter wave antennas may be 1000 feet or less. In such an example, local controllers 167 and 168 may have direct wireless (e.g., cellular and/or non-cellular wireless) communications with dual-mode vehicles 161-164 (and in various examples, surface vehicle 151, mobile devices 141 and 142, etc.). As noted above, local controllers 167 and 168 may be in communication with and may be configured to send instructions to and/or otherwise control traffic signals in an assigned area. Thus, for instance, in the example of FIG. 1, local controller 167 may be in communication with traffic signals 181 and 182. In various examples, the connections between local controller 167 and traffic signals 181 and 182 may comprise wired and/or wireless links. For example, traffic signals 181 and 182 may be part of a traffic management system for both surface and aerial vehicular traffic that includes at least area 191, and that includes local controller 167.

As illustrated in FIG. 1, each of the mobile devices 141 and 142 may comprise, for example, a cellular telephone, a smartphone, a tablet computing device, a laptop computer, a wireless enabled wristwatch, or any other wireless and/or cellular-capable mobile telephony and computing devices (broadly, a "mobile device" or "mobile endpoint device"). In one example, mobile devices 141 and 142 may be equipped for cellular and non-cellular wireless communication. For instance, mobile devices 141 and 142 may include components which support peer-to-peer and/or short range wireless communications. Thus, each of the mobile devices 141 and 142 may include one or more radio frequency (RF) transceivers, e.g., for cellular communications and/or for non-cellular wireless communications, such as for IEEE 802.11 based communications (e.g., Wi-Fi, Wi-Fi Direct), IEEE 802.15 based communications (e.g., Bluetooth, Bluetooth Low Energy (BLE), and/or ZigBee communications), and so forth.

Dual-mode vehicles 161-164 may each comprise a vehicle that is equipped to operate as a conventional surface-operating vehicle and an aerial operating vehicle, and to comply with and follow all relevant laws and regulations regarding surface-based vehicular operation on road, highways, or other rights-of-way rules within region 190, as well as all relevant laws and regulations regarding aerial vehicular operation within region 190. In the example of FIG. 1, dual-mode vehicles 161 and 162 may have vertical-take-off-and-landing (VTOL) configurations, while dual-mode vehicles 163 and 164 may have forward-take-off-and-landing (FTOL) configurations. As noted above, each of dual-mode vehicles 161-164 may be equipped for cellular and/or non-cellular wireless communications with local controllers 167 and 168, base stations 117 and 118, other ones of the dual-mode vehicles 161-164 and/or surface vehicle 151 (and other surface vehicles), via peer-to-peer communications, and so forth.

Dual-mode vehicles 161-164 each may include one or more on-board units (OBUs) (e.g., one or more computing system(s)/processing system(s)) and one or more radio frequency (RF) transceivers, e.g., for cellular communications, for communications via an LTE sidelink, a 5G sidelink, or the like, for communications via a dedicated short range communication (DSRC) networks, via IEEE 802.11 and/or 802.15-based communications, and so forth. In one example, dual-mode vehicles 161-164 may be configured to detect each other within a vicinity, e.g., via wireless peer sensing, such as via a wireless peer discovery messages (e.g., a Wi-Fi Direct peer discovery messages or the like).

Figure 5:
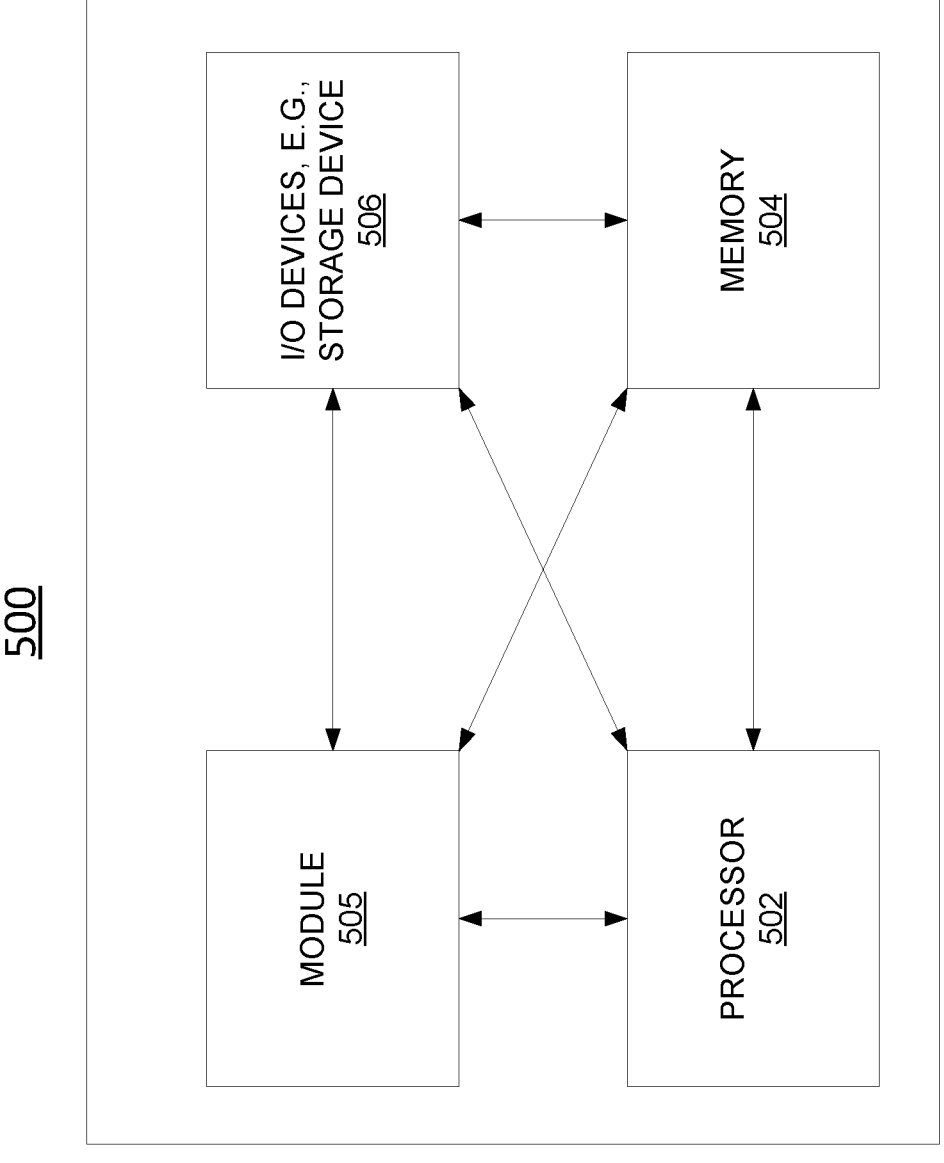
FIG. 5 illustrates an example high-level block diagram of a computing device specifically programmed to perform the steps, functions, blocks, and/or operations described herein.

For example, dual-mode vehicles 161-164 may each comprise a computing device or processing system, such as computing system 500 depicted in FIG. 5, and may be configured to perform various steps, functions, and/or operations in connection with examples of the present disclosure for identifying that a traffic management application of a dual-mode vehicle is designated as a leader traffic management application within or near a traffic zone and transmitting via the traffic management application of the dual-mode vehicle a navigation instruction to at least one other traffic management application of at least one other dual-mode vehicle and/or for obtaining via a traffic management application of a dual-mode vehicle a navigation instruction from a leader traffic management application and performing at least one of executing a navigation action or displaying at least a portion of a permitted route that is in conformance with the navigation instruction.

For instance, dual-mode vehicles 161-164 may each be configured to perform one or more steps, functions, or operations in connection with the example method 300 and/or the example method 400 described below. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 5 and discussed below) or multiple computing devices collectively configured to perform various steps, functions, and/or operations in accordance with the present disclosure.

In one example, the OBU(s) of each of dual-mode vehicles 161-164 may include a navigation system (such as a Global Positioning System (GPS) navigation unit) via which an operator may enter a destination, obtain navigation path recommendations to reach the destination, and so forth. In one example, the OBU(s) of each of dual-mode vehicles 161-164 may also include automated and/or operator assist functionality, such as for surface-based operations: lane sensing/lane maintenance capability and/or lane departure warning, following distance capability, automatic braking and/or crash avoidance capability, and so forth. Similarly, for aerial mode operations, the automated and/or operator assist functionality may include: flight path maintenance, speed maintenance, heading/bearing maintenance, yaw, pitch, and/or roll maintenance, altitude maintenance, etc., warnings for any one or more of the above (e.g., a low altitude warning, an altitude change warning, a stall warning, etc.).

In accordance with the present disclosure, each of dual-mode vehicles 161-164 may include a traffic management application (TMA). Each TMA may run on dedicated hardware of one of the dual-mode vehicles 161-164 (e.g., separate from any other hardware, including operational control systems (such as fly-by-wire control systems, differential torque systems (e.g., for surface-based operation), etc.), navigation and positioning systems (e.g., a global positioning system (GPS) unit/module), user interface systems, climate control systems, entertainment systems, etc.). For instance, the TMA may comprise or run on a separate, dedicated OBU. Alternatively, or in addition, each TMA may run on shared hardware via a dedicated partition that is separate from any other systems of the dual-mode vehicle. For instance, the dedicated partition may be separately encrypted from one or more partitions for one or more other systems. In one example, the dedication partition may be associated with its own trusted platform module (TPM), e.g., where other systems of the dual-mode vehicle may have one or more other TPMs. Similarly, in one example, each TMA may utilize its own dedicated antennas and radio(s) for communicating with other TMAs of others of the dual-mode vehicles 161-164, local controller 167 and 168, etc. In another example, each TMA may share antenna and radio resources with other systems, while communications to and from the TMA may be inaccessible to the memory, storage, and/or other resources in use by other systems.

As shown in FIG. 1, telecommunication network 110 may also include one or more servers 112. In one example, each of the server(s) 112 may comprise a computing device or processing system, such as computing system 500 depicted in FIG. 5 and may be configured to provide one or more functions in connection with examples of the present disclosure for identifying that a traffic management application of a dual-mode vehicle is designated as a leader traffic management application within or near a traffic zone and transmitting via the traffic management application of the dual-mode vehicle a navigation instruction to at least one other traffic management application of at least one other dual-mode vehicle and/or for obtaining via a traffic management application of a dual-mode vehicle a navigation instruction from a leader traffic management application and performing at least one of executing a navigation action or displaying at least a portion of a permitted route that is in conformance with the navigation instruction. For example, one or more of the server(s) 112 may be configured to perform one or more steps, functions, or operations of a policy manager as described herein. For instance, server(s) 112 may collect, store, and process data regarding capabilities of dual-mode vehicles 161-164, such as top speed, fuel capacity, turn radius, stall speed, etc. In one example, server(s) 112 may coordinate among local controllers (e.g., including local controllers 167 and 168), may assign areas to local controllers, e.g., areas 191 and 192, respectively, in region 190, may designate local controllers for backup/failover purposes, and so forth. In one example, server(s) 112 may obtain, store, and disseminate to local controllers 167 and 168 various parameters or constraints relating to mode transitions for dual-mode vehicles (e.g., policies/configuration parameters based upon laws, rules, regulations, etc., as obtained by the server(s) 112). Server(s) 112 may also obtain, store, and disseminate to local controllers 167 and 168 other information in connection with examples of the present disclosure for identifying that a traffic management application of a dual-mode vehicle is designated as a leader traffic management application within or near a traffic zone and transmitting via the traffic management application of the dual-mode vehicle a navigation instruction to at least one other traffic management application of at least one other dual-mode vehicle and/or for obtaining via a traffic management application of a dual-mode vehicle a navigation instruction from a leader traffic management application and performing at least one of: executing a navigation action or displaying at least a portion of a permitted route that is in conformance with the navigation instruction. Such information may include, for instance, local rules (e.g., a "rule set") for vehicular operations, including aerial operations, within area 191 and/or area 192 (or region 190 in general), geographic data (e.g., map data, such as roadway information, topology information, etc.), traffic data (e.g., road traffic data), pedestrian density data (e.g., from tracking mobile device locations, such as mobile devices 141 and 142), operator licensing and/or skill level data, dual-mode vehicle performance and/or capability data, TMA hash keys (e.g., for verifying that dual-mode vehicles 161-164 and others have up-to-date TMAs), and so forth.

In one example, dual-mode vehicles 161-164 may be operated as endpoint devices/user equipment (UE) of the telecommunication network 110. Thus, in one example, server(s) 112 may track connectivity information of dual-mode vehicles 161-164, location information of dual-mode vehicles 161-164, and so forth. In one example, surface vehicle 151 may similarly be operated as endpoint devices/user equipment (UE) of the telecommunication network 110, and may be tracked and managed accordingly. Thus, in one example, server(s) 112 may also provide to local controllers 167 and 168 location information regarding dual-mode vehicles 161-164 and/or surface vehicle 151 (e.g., for those dual-mode vehicles that may not be in direct or local communication with local controller 167 or local controller 168, respectively). For ease of illustration, various additional elements of telecommunication network 110 are omitted from FIG. 1. It should also be noted that although local controllers 167 and 168 are described as obtaining various information from server(s) 112, in other, further, and different examples, local controllers 167 and 168 may obtain the same or similar information directly from dual-mode vehicles 161-164, surface vehicle(s) 151, mobile devices 141 and 142, etc., or locally from such entities (e.g., via one or more of base stations 117 and 118, without such information flowing from these entities through server(s) 112). Similarly, local controllers 167 and 168 may communicate with each other via peer-to-peer connections to exchange various information regarding road and/or aerial traffic, specific vehicle locations, weather conditions, and so forth. In such case, local controllers 167 and 168 may communicate wirelessly or via terrestrial links (e.g., one or more optical links coupling the base stations 117 and 118, local controllers 167 and 168, and other equipment of wireless access network(s) 115 with each other, with telecommunication network 110, etc.).

As further illustrated in FIG. 1, the system 100 includes server(s) 125. In one example, server(s) 125 may include a geographic information system (GIS). For instance, server(s) 125 may also store and provide one or more road map databases, such as the United States Geological Survey (USGS) National Transportation Dataset (NTD), ArcGIS, HERE map database, and so forth. In one example, such databases may include or comprise a digital elevation model (DEM), which may comprise a set of raster files or other format files, that records elevations for a set of given points (latitude, longitude). Alternatively, or in addition, server(s) 125 may provide one or more separate digital elevation models that may be combined with road map database(s). For instance, the digital elevation model may comprise Shuttle Radar Topography Mission (SRTM) data, which may provide measurements of elevation (e.g., relative to mean sea level (MSL)) in 1 arc-second, 30 meter resolution. In one example, the digital elevation model may be maintained by a commercial provider, such as Forsk Atoll, and so forth. In one example, server(s) 125 may provide traffic data (e.g., road traffic) data in addition to other geographic information. For instance, one or more of server(s) 125 may alternatively or additionally provide a traffic data service.

Accordingly, in one example, server(s) 112 may obtain, utilize, and/or store geographic, traffic, and/or topology information (e.g., for region 190) from server(s) 125. In one example, server(s) 112 may combine or overlay geographic, traffic, and/or topology information from multiple sources (e.g., from any of server(s) 125, from local controllers 167 and 168, from mobile devices 141 and 142, and so forth).

In one example, the local controllers 167 and 168 may each comprise a computing device or processing system, such as computing system 500 depicted in FIG. 5, and may be configured to perform various steps, functions, and/or operations in connection with examples of the present disclosure for identifying that a traffic management application of a dual-mode vehicle is designated as a leader traffic management application within or near a traffic zone and transmitting via the traffic management application of the dual-mode vehicle a navigation instruction to at least one other traffic management application of at least one other dual-mode vehicle and/or for obtaining via a traffic management application of a dual-mode vehicle a navigation instruction from a leader traffic management application and performing at least one of executing a navigation action or displaying at least a portion of a permitted route that is in conformance with the navigation instruction.

For example, local controllers 167 and 168 may receive, process, and respond to take-off and landing requests from dual-mode vehicles 161-164 and others. For instance, the determination of whether to grant or deny a request by local controller 167 for dual-mode vehicle 164 to take-off may be based upon several factors, including: geographical conditions (e.g., topology or other aspects), road conditions and/or weather conditions, which may be determined from sensors and vehicles at or near the requested location (such as surface vehicle 151) in communication with and accessible to the local controller 167 (e.g., rain, ice, traffic density, traffic speed, etc.), time of the day, day of the week, time of year, etc. (for instance, 8:00 AM take-off may be allowed on weekdays but not on weekends), operator qualifications, capabilities of dual-mode vehicle 164 (e.g., VTOL or FTOL, etc.), any fees associated with landing and/or taking-off, such as determined by governmental or regulatory authorities, and so on. Local controller 167 may perform similar operations for landing requests. In addition, local controller 168 may perform the same or similar operations with respect to area 192.

In an illustrative example, dual-mode vehicles 161-163 may be present within area 192 and may determine a leader traffic management application (TMA) from among the dual-mode vehicles 161-163. In one example, local controller 168 may initially verify that each dual-mode vehicle entering the area 192 is equipped with an up-to-date or otherwise acceptable TMA, as well as a current rule set for vehicular operations within area 192. For instance, local controller 168 may provide a hashing algorithm to run against the TMA code of a dual-mode vehicle, the result of which the dual-mode vehicle may provide back to the local controller 168. If the TMA is not acceptable, the local controller 168 may transmit a new TMA application to the dual-mode vehicle. In one example, the same or a different hashing algorithm may be run against a rule set for area 192 and/or region 190. If not current, the local controller 168 may transmit the current rule set to the dual-mode vehicle. The same or a similar process may be applied with respect to dual-mode vehicles on the ground and intending to take-off within the area 192. As noted above, the local controller 168 may be responsible for authorizing and managing take-off and landing operations of dual-mode vehicles in area 192. However, for those that are airborne, in one embodiment dual-mode vehicles may coordinate amongst themselves for safety and traffic efficiency of airborne navigation and operations.

To illustrate, dual-mode vehicles 161-163, each having a respective traffic management application (TMA) operating thereon, may be present within area 192. In one example, each TMA instance may connect to other TMA instances and exchange information on the respective dual-mode vehicles 161-163, such as: type of dual-mode vehicle and/or capabilities (e.g., VTOL or FTOL, maximum speed, etc.), current speed and direction, potential stops, expected time to land, special designation(s), if any (e.g., first responder vehicle, delivery vehicle, common carrier, etc.), and so on. In one example, each TMA may calculate independently how long its host dual-mode vehicle will be in the area 192 and how many other dual-mode vehicles (e.g., TMAs thereof) it can contact and for how long. In one example, each TMA may assign a value/score to other TMAs. For instance, a higher value may mean a TMA is expected to stay in the area 192 the longest and/or will have contact with the highest number of other TMAs of other dual-mode vehicles, has a higher trust or priority designation (e.g., a first responder vehicle), and so forth.

In one example, the TMAs of dual-mode vehicles 161-163 may exchange results. In addition, each TMA may sum the values/scores assigned to itself and to other TMAs. The TMA with the highest combined score may be designated as a leader TMA. In this regard, it should be noted that all of the participating TMA instances should reach the same results. In one example, the designation of a leader TMA may be for a fixed period of time, e.g., for at least 30 seconds, for at least one minute, at least two minutes, at least five minutes, etc., may be for an expected period of time that a dual-mode vehicle in which the leader TMA is installed is expected to stay within the traffic zone, etc. In one example, the TMA instances may elect a leader arbitrarily based on a random number generator applied by each instance. In one example, a randomization factor may be added to values/ scores generated based upon the above described criteria, which may help to ensure that the same TMA is not constantly elected the leader. For instance, placing a disproportionate responsibility on one TMA and the dual-mode vehicle in which it is installed may lead to excessive battery usage, excessive computational cycles, etc.

For illustrative purposes, a TMA of dual-mode vehicle 161 may be elected as a leader TMA. TMAs of dual-mode vehicles 161-163 may continue to communicate peer-to-peer with each other. For instance, dual-mode vehicles 162 and 163 may communicate their intended navigation paths and/or intended maneuvers/operations to the leader TMA of dual-mode vehicle 161 via respective TMAs within each of dual-mode vehicles 162 and 163. In one example, other modules within each of dual-mode vehicles 162 and 163, such as a navigation system/module, may communicate with the on-board TMA, where the TMA may then communicate remotely with the leader TMA. The leader TMA may then grant or deny permission to engage in such maneuvers/operations, may grant or deny authorization for intended navigation paths, may provide instructions for alternate maneuvers/operations and/or navigation paths, and so forth. In one example, the leader TMA of dual-mode vehicle 161 may provide instructions, assign priorities, and/or may notify of acceptable maneuvers, such as assigning passing priorities (e.g., green light/proceed signal to dual-mode vehicles proceeding in certain direction(s), stop/hold signals for other dual-mode vehicles, acceptable altitude ranges, etc.). For example, dual-mode vehicles 162 and 163 may have destinations and/or preferred navigation paths that may conflict. As such, the leader TMA of dual-mode vehicle 161 may, for instance, assign a priority to dual-mode vehicle 162 to continue straight ahead at a current altitude, while dual-mode vehicle 163 may be instructed to change altitude, to alter course to give way to dual-mode vehicle 162, to alter course in a specific direction, etc. In one example, the leader TMA may be aware of first responder dual-mode vehicles and may grant such responder dual-mode vehicles preemptive permission to pass or engage in other aerial maneuvers/operations. For instance, in one example, dual-mode vehicle 162 may be a police vehicle in-route to a call, which may be made aware to the leader TMA of dual-mode vehicle 161 by the TMA of dual-mode vehicle 162, and which may cause the leader TMA to grant dual-mode vehicle 162 priority over dual-mode vehicle 163.

It should be noted that the dual-mode vehicle 161 (and/or an operator thereof) may also seek to engage in maneuvers/operations, to proceed along a desired course, etc. In one example, requests for permission to engage, permission to proceed, etc., may be made via one or more other modules within dual-mode vehicle 161. For instance, a navigation system/module of dual-mode vehicle 161 may communicate with the on-board TMA (e.g., which may currently be assigned as the leader TMA). Notably, the leader TMA may process the request the same as if it were received from a TMA of any other dual-mode vehicle. However, the response may be returned via a local bus, network connection, or the like within dual-mode vehicle 161 itself, rather than being transmitted remotely via radio and antenna resources. It should also be noted that the leader TMA may send instructions to TMAs of dual-mode vehicles 162 and 163, and to other modules of dual-mode vehicle 161 without necessarily having received requests for maneuvers/operations and/or requests for specific navigation paths. For instance, the leader TMA may detect that dual-mode vehicles 162 and 163 may have conflicting paths, e.g., without dual-mode vehicles 162 and 163 necessarily being aware of such conflict. As such, the leader TMA may send one or more instructions to dual-mode vehicle 162 and/or dual-mode vehicle 163 on its own initiative.

In one example, the leader TMA may be re-established from time to time, e.g., before or at an expiration of a time period for which the leader TMA has be so designated, when it appears that the leader TMA will be exiting the area 192, when there is a condition detected by one or more other TMAs that the leader TMA is unavailable (e.g., not responding in a timely manner, incomplete responses, etc.), and so forth. In one example, new dual-mode vehicles entering or approaching area 192 may be informed of the leader TMA, e.g., by the TMAs of one or more of the already-present dual-mode vehicles. For instance, one or more of dual-mode vehicles 161-163 may transmit notifications to dual-mode vehicle 164 seeking to enter the area 192 that the TMA of dual-mode vehicle 161 is the current leader TMA. In one example, the notification(s) may be provided in response to a request and/or a broadcast of the TMA of dual-mode vehicle 164 of an intention to enter the area 192. The TMA of dual-mode vehicle 164 may then be configured to receive and follow the instructions of the leader TMA of dual-mode vehicle 161. As described above, the local controller 168 and/or the leader TMA of dual-mode vehicle 161 may also confirm that the TMA of dual-mode vehicle 164 has an acceptable TMA version, a current rule set for area 192, etc.

In addition, in one example, the leader TMA may establish and maintain communication with local controller 168. For example, the local controller 168 may grant permissions and timings to take-off and land within area 192. In one example, the local controller 168 may receive requests and communicate responses granting or denying permission to the dual-mode vehicles seeking to engage in such take-offs and landings. Alternatively, or in addition, the leader TMA of dual-mode vehicle 161 may receive such requests (e.g., for landing requests), forward such requests to the local controller 168, receive responses, and forward the responses to the respective dual-mode vehicles. For example, dual-mode vehicle 163 may seek to land in area 192 and may submit the request via its own TMA communicating to the leader TMA, and the leader TMA communicating with local controller 168. In another example, the requesting dual-mode vehicle 163 may communicate directly with the local controller 168 and may receive a response granting or denying a request to land, while the local controller 168 may also notify the leader TMA. Thus, for example, the leader TMA may use this information to grant or deny requests of other dual-mode vehicles (e.g., dual-mode vehicle 162 and dual-mode vehicle 161 hosting the leader TMA itself) in the vicinity based upon the landing approval (or denial).

For instance, if a local controller 168 grants landing permission to dual-mode vehicle 163 to land at a particular location in the area 192, if dual-mode vehicle 162 has an intended navigation path and/or maneuver(s) that would be near the landing location, the leader TMA may send an instruction to the TMA of dual-mode vehicle 162 to slow down so as to not arrive in the vicinity at the same time as the intended landing, to navigate away from the intended landing location and/or to proceed to another altitude, and so forth. It should be noted that the local controller 168 may coordinate with ground-based vehicles, traffic signals, etc. so as to provide a clear landing for dual-mode vehicle 163. However, for ease of illustration, these components are omitted from the example of FIG. 1.

In one example, an instruction received by a TMA from a leader TMA may be forwarded to other on-board systems (e.g., one or more OBUs, such as a navigation system, etc.)

for performing one or more actions in response to the instruction. For example, a dual-mode vehicle in autonomous operation mode may execute a navigation action in accordance with the instruction. In another example, a dual-mode vehicle may display at least a portion of a permitted route that is in conformance with the instruction. In this regard, FIG. 2 illustrates an example display interface that presents at least a portion of a permitted route, in accordance with the present disclosure.

It should also be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, one or more operations described above with respect to local controllers 167 and 168 may alternatively or additionally be performed by server(s) 112 and/or server(s) 125, and vice versa. In addition, although server(s) 112 and 125 are illustrated in the example of FIG. 1, in other, further, and different examples, the same or similar functions may be distributed among multiple other devices and/or systems within the telecommunication network 110, wireless access network(s) 115, and/or the system 100 in general that may collectively provide various services in connection with examples of the present disclosure for identifying that a traffic management application of a dual-mode vehicle is designated as a leader traffic management application within or near a traffic zone and transmitting via the traffic management application of the dual-mode vehicle a navigation instruction to at least one other traffic management application of at least one other dual-mode vehicle and/or for obtaining via a traffic management application of a dual-mode vehicle a navigation instruction from a leader traffic management application and performing at least one of: executing a navigation action or displaying at least a portion of a permitted route that is in conformance with the navigation instruction. Additionally, devices that are illustrated and/or described as using one form of communication (such as a cellular or non-cellular wireless communications, wired communications, etc.) may alternatively or additionally utilize one or more other forms of communication. Thus, these and other modifications are all contemplated within the scope of the present disclosure.

Figure 2:
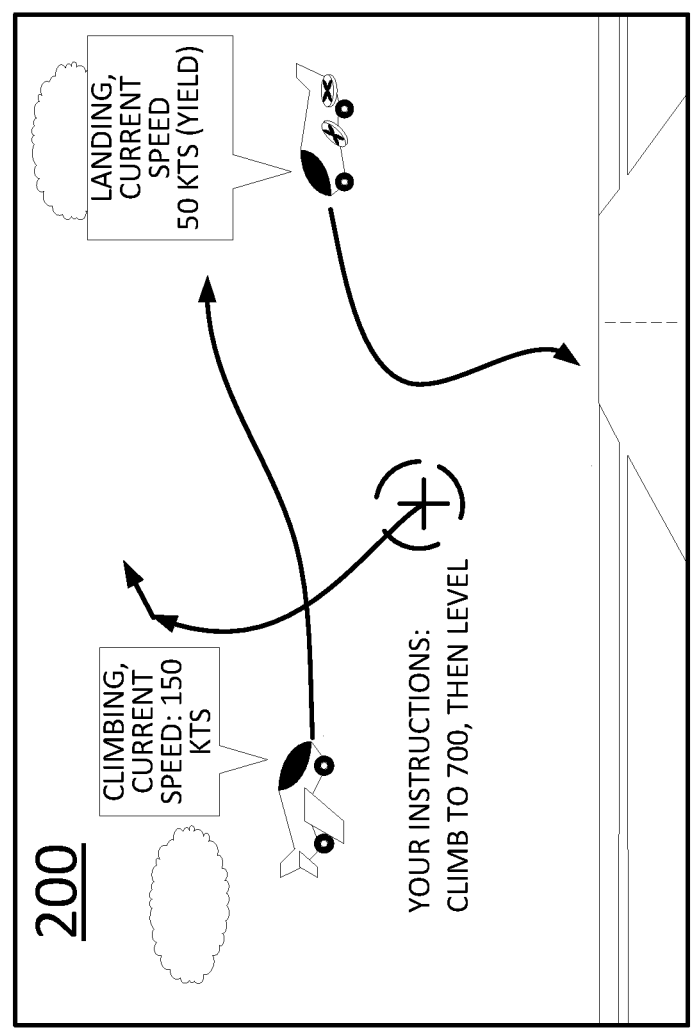
FIG. 2 illustrates an example display interface that presents at least a portion of a permitted route (e.g., an augmented reality (AR) view), in accordance with the present disclosure.

To further aid in understanding the present disclosure FIG. 2 illustrates an example of visual presentation of information associated with navigation instructions for a dual-mode vehicle and for other dual-mode vehicles in a traffic zone, in accordance with the present disclosure. In particular, the example AR view 200 illustrates what may be seen by and presented to an operator of a dual-mode vehicle in aerial mode. In one example, the AR view may be rendered on a display screen of the dual-mode vehicle or an augmented reality (AR) display (e.g., of an AR headset of an operator of the dual-mode vehicle, or a projection of information on a windshield, dashboard, or other locations of the dual-mode vehicle). For instance, AR content may be overlaid on real-world imagery as visual aid(s) to the operator of the dual-mode vehicle. In one example, the AR view 200 may be in accordance with a holographic display of a headset of an operator of the dual-mode vehicle or an integrated holographic display (e.g., a holographic display screen, or windshield or dashboard projection). As referred to herein, a holographic display may use full (or partial) 3D mesh or point cloud-based volumetric video, or other holographic and/or photogrammetric techniques, such as a holographic video utilizing waveguide-based light field capture and display. In the latter case, the display may comprise a waveguide-based display that is capable of rendering holographic images/video comprising light-field information describing AR content to be rendered/projected.

To illustrate, the example AR view 200 includes real-world imagery of the ground, roads on the ground, two additional dual-mode vehicles within a field-of-view, clouds in the sky, and so forth. In one example, the AR content may include the intended navigation paths of the other two dual-mode vehicles (e.g., indicated with arrowed-lines). In addition, the AR content may include additional information about these other dual-mode vehicles, such as a short description of upcoming maneuvers/operations, such as "climbing," "landing," or the like, current speeds, etc. The additional information may further include a type of vehicle (e.g., VTOL or FTOL), vehicle designations (e.g., a police or other first responder dual-mode vehicles, if applicable), and so forth. In one example, the additional information may be presented in the form of a dialog box, such as illustrated in FIG. 2. However, in other examples, the additional information may be presented in a different form, such as hovering text near the associated dual-mode vehicle, etc. As further shown in FIG. 2, the example AR view 200 may also include an assigned navigation path for the dual-mode vehicle (and for an operator thereof) to follow. For instance, the example AR view 200 includes a target showing the current bearing/trajectory of the dual-mode vehicle and an arrowed-line showing that the dual-mode vehicle should climb and turn slightly left before turning slightly back to the right. An additional arrowed-line indicates that the dual-mode vehicle should then engage in level flight after completing the climb.

The example AR view 200 further indicates the navigation instructions for the dual-mode vehicle in overlay text form, e.g.: "your instructions: climb to 700, then level." It should be noted that although two arrowed-lines are included for the maneuvers of the dual-mode vehicle, in another example a single, uninterrupted line may be used to indicate the navigation path that has been assigned to/approved for the dual-mode vehicle. Similarly, it should be noted that the types of instructions, the additional information included for the other dual-mode vehicles, and so forth, may vary in other, further, and different examples. For instance, different operators may prefer different interface settings to display speeds of other dual-mode vehicles in miles-per-hour, meters-per-second, etc. In one example, the path indicators for the dual-mode vehicle presenting the AR view 200 and the other dual-mode vehicles may be different, such as different colors, different line styles or thicknesses, different highlighting, etc. Similarly, different colors, different line styles or thicknesses, different highlighting, etc. may be used to indicate criticality of other dual-mode vehicles, such as those that are anticipated to pass closer to the dual-mode vehicle presenting the AR view 200, emergency services/first responder dual-mode vehicles, dual-mode vehicles in distress or signaling an emergency, etc. In still other examples, different indicators may be applied to the other dual-mode vehicles, such as highlighting or shading dual-mode vehicles to indicate certain designations, statuses, or the like, and/or to draw particular attention to such dual-mode vehicles. Thus, these and other modifications are all contemplated within the scope of the present disclosure.

FIG. 3 illustrates a flowchart of an example method 300 for identifying that a traffic management application of a dual-mode vehicle is designated as a leader traffic management application within or near a traffic zone and transmitting via the traffic management application of the dual-mode vehicle a navigation instruction to at least one other traffic management application of at least one other dual-mode vehicle. In one example, steps, functions and/or operations of the method 300 may be performed by a device and/or processing system as illustrated in FIG. 1, e.g., by one of dual-mode vehicles 161-164, or any one or more components thereof, such as an OBU and/or a TPM, etc., or by one of the dual-mode vehicles 161-164 and/or any one or more components thereof in conjunction with one or more other components of the system 100, such as local controller 167 and/or local controller 168, one or more of server(s) 112, elements of wireless access network 115, telecommunication network 110, and so forth. In one example, the steps, functions, or operations of method 300 may be performed by a computing device or processing system, such as computing system 500 and/or hardware processor element 502 as described in connection with FIG. 5 below.

For instance, the computing system 500 may represent any one or more components of the system 100 that is/are configured to perform the steps, functions and/or operations of the method 300. Similarly, in one example, the steps, functions, or operations of the method 300 may be performed by a processing system comprising one or more computing devices collectively configured to perform various steps, functions, and/or operations of the method 300. For instance, multiple instances of the computing system 500 may collectively function as a processing system. For illustrative purposes, the method 300 is described in greater detail below in connection with an example performed by a processing system. The method 300 begins in step 305 and proceeds to step 310.

At step 310, the processing system (e.g., of a dual-mode vehicle including at least one processor executing a traffic management application (TMA)) detects a proximity to a traffic zone for vehicular traffic. The dual-mode vehicle may have two modes of operation comprising a surface mode of operation and an aerial mode of operation, as described above. The proximity may be detected via a global positioning system (GPS) unit of the dual-mode vehicle, via a detection/sensing of other dual-mode vehicles asserting to be present in the traffic zone (and hence being proximate to such traffic zone), via detection/sensing of a local controller of the traffic zone (and hence being proximate to the traffic zone), and so forth.

At step 315, the processing system verifies, e.g., via the TMA, a rule set for vehicular operations within the traffic zone, e.g., including dual-mode vehicular operations. For instance, step 315 may include obtaining a hash algorithm from a local controller to run against the rule set, providing a hash output to the local controller, and receiving a confirmation that the rule set is current. Alternatively, if the hash fails, the local controller may provide the current rule set to the TMA. In another example, the TMA may provide an initial indication that it does not possess a rule set for the traffic zone, in which case, no hashing algorithm will be applied. Rather, the local controller may send the rule set directly. For example, the rule set may be requested by the processing system in response to determining the proximity to the traffic zone. It should again be noted that the local controller may manage take-off and landing operations of dual-mode vehicles within the traffic zone. In addition, the local controller may manage surface-operating traffic within the traffic zone (e.g., controlling traffic signals such as lights, lane open/closed signals, etc., and/or communicating with surface-operation vehicles, and so forth).

At step 320, the processing system identifies, e.g., via the TMA, a leader TMA from among one or more TMAs of one or more dual-mode vehicles within or near the traffic zone (e.g., where the plurality of dual-mode vehicles includes the dual-mode vehicle hosting the processing system performing the method 300, and where "near" may include dual-mode vehicles that are proximate to the traffic zone (e.g., in an adjacent traffic zone, within a threshold distance from a closest boundary point of the traffic zone, within a communication range of a local controller of the traffic zone and/or one or more other dual-mode vehicles that are within the traffic zone, etc.)). For example, step 320 may include providing first vehicular information regarding the dual-mode vehicle to others of the plurality of TMAs. In one example, step 320 may further include receiving, from the other TMAs, second vehicular information regarding others of the plurality of dual-mode vehicles.

In one example, step 320 may further include calculating first scores for the plurality of TMAs according to a set of ranking criteria, where the set of ranking criteria includes at least one criterion. For instance, the at least one criterion may comprise ranking TMAs in an order of priority. For example, the order of priority may rank emergency service dual-mode vehicles higher than persistent dual-mode vehicles, persistent dual-mode vehicles may be ranked higher than transient dual-mode vehicles, and transient dual-mode vehicles comprising autonomous dual-mode vehicles may be ranked higher than transient dual-mode vehicles that are human-operated. In one example, the types of dual-mode vehicles and/or their statuses are indicated in the second vehicular information. Alternatively, or in addition, the at least one criterion may include ranking the plurality of traffic management applications based upon intended durations of remaining time within the traffic zone, e.g., where the intended durations are included in the second vehicular information. In addition, in one example, the set of ranking criteria may be received as part of or accompanying the rule set for vehicular operations within the traffic zone.

In one example, step 320 may further include providing, to the other TMAs, the first scores of the plurality of TMAs, and receiving, from the other TMAs, second scores of the plurality of TMAs. Lastly, step 320 may include adding the first scores to the second scores to obtain combined scores for each of the plurality of TMAs, where the leader traffic management application is identified as a TMA from among the plurality of TMAs having a highest combined score. In one example, the TMAs may exchange the results to confirm that all have identified the same leader TMA (which should be the case).

At optional step 325, the processing system, e.g., via the TMA, may forward a navigation request to the leader TMA. For example, the dual-mode vehicle and/or the operator thereof may seek to change altitude, alter course, continue on an intended path, change to a different destination and/or intended path, etc. It should be noted that not all actions/maneuvers/operations may require notification to a leader TMA and specific approval. However, if a navigation request is submitted at optional step 325, it may relate to an action/maneuver/operation for which a notice is to be given, e.g., according to the local rule set for vehicular operations in the traffic zone.

At step 330, the processing system obtains or receives, e.g., via the TMA, at least one navigation instruction from the leader TMA. For instance, the at least one navigation instruction may be selected in accordance with the rule set for vehicular operations within the traffic zone (e.g., where the rule set is possessed by each TMA, including the leader TMA). In one example, in accordance with the rule set for vehicular operations in the traffic zone, the leader TMA may grant or deny permission to engage in maneuvers/operations, may grant or deny authorization for intended navigation paths, may provide instructions for alternate maneuvers/ operations and/or navigation paths, and so forth. In one example, the at least one navigation instruction may include an assignment of priority, and/or may indicate one or more acceptable maneuvers. In one example, the at least one navigation instruction may be obtained in response to a request submitted at optional step 325. In another example, the at least one navigation instruction may be received in the absence of such as request, e.g., receiving such navigation instructions automatically from a leader TMA without prompting the leader TMA.

At step 335, the processing system performs at least one of: (1) executing a navigation action in accordance with the at least one navigation instruction, or (2) displaying at least a portion of a permitted route that is in conformance with the at least one navigation instruction. In one example, step 335 may comprise forwarding the at least one navigation instruction to an on-board unit (OBU) of the dual-mode vehicle via the TMA. For instance, the OBU unit may comprise a display of the dual-mode vehicle for the displaying of at least a portion of the permitted route or an autonomous navigation module of the dual-mode vehicle for executing the navigation action in accordance with the at least one navigation instruction. In one example, the displaying may comprise displaying at least the portion of the permitted route as a path in a 3D space representing the traffic zone. For instance, the at least the portion of the permitted route may be presented in a manner such as illustrated in the example AR view 200 of FIG. 2, or the like. In one example, the at least the portion of the permitted route may be presented via an AR display of the dual-mode vehicle, e.g., an AR headset of an operator of the dual-mode vehicle or an integrated AR display, such as for projection on a windshield or dashboard, or a display screen that presents camera captured image data with overlay AR content. In addition, in one example, the AR display may comprise a holographic display of a headset of an operator of the dual-mode vehicle, or an integrated holographic display of the dual-mode vehicle. In one example, the displaying may include displaying at least one intended route of at least one other dual-mode vehicle of the plurality of dual-mode vehicles. In addition, in such an example, the displaying may further include presenting the at least the portion of the permitted route in a first color and the at least one intended route of the at least one other dual-mode vehicle in at least a second color (or similar indicator(s), such as shading, highlighting, line type, etc.).

It should be noted that in an example in which step 335 includes executing the navigation action in accordance with the at least one navigation instruction, the execution of the navigation action/maneuver/operation may be in accordance with rules of the rule set for vehicular operations within the traffic zone. In other words, the dual-mode vehicle is to continue to follow the local traffic rules on its own accord; in other words, its every action is not controlled by the leader TMA. Rather, the leader TMA provides higher level guidance/instructions, and then each dual-mode vehicle and/or the operator thereof is tasked with following such instructions and in addition to complying with all relevant and applicable local traffic rules, unless there is a direct conflict which may require the use of deconfliction rules. Thus, the rule set may include rules for determining priority and/or deconfliction rules, and may also include basic right-of-way rules, such as "keep right, pass left," "keep oncoming traffic to the left," "yield to emergency vehicles," etc.

At optional step 340, the processing system may obtain, e.g., via the TMA, an indication that the leader TMA is anticipated to leave the traffic zone. For example, the leader TMA may identify that the host dual-mode vehicle is intending or will imminently be leaving the traffic zone and may notify the other TMAs.

At optional step 345, the processing system may identify, e.g., via the TMA, a second leader TMA from among the plurality of TMA of the plurality of dual-mode vehicles within or near the traffic zone. For instance, in one example, optional step 345 may include the collective selection of a TMA having a next highest overall score as determined at step 320 as a second leader TMA (e.g., a new leader TMA—in other words, the leader TMA and the "second" leader TMA are not simultaneously the leader, but the second leader TMA will take over via a handover of the leadership role). In another example, optional step 345 may include a subsequent scoring/voting to elect the second leader TMA. For instance, optional step 345 may comprise the same or similar operations as described above in connection with step 320.

At optional step 350, the processing system may forward, e.g., via the TMA, a second navigation request to the second leader TMA. For instance, optional step 350 may comprise the same or similar operations as optional step 325, however, involving a further request at a later time in which the second leader TMA is designated as the new leader.

At optional step 355, the processing system may obtain, e.g., via the TMA, at least one additional navigation instruction from the second leader TMA. For instance, optional step 355 may comprise the same or similar operations as step 330, however, involving a different instruction from the second leader TMA at a later time.

At optional step 360, the processing system may perform at least one of: (1) executing a second navigation action in accordance with the at least one additional navigation instruction, or (2) displaying at least a second portion of the permitted route or of a second permitted route that is in conformance with the at least one additional navigation instruction. For instance, optional step 360 may comprise the same or similar operations as step 335 for the subsequent navigation instruction.

Following step 335 or any of optional steps 340-360, the method 300 may proceed to step 395. At step 395, the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as steps 325-335, steps 330 and 335, etc. For instance, the processing system may continue to submit navigation requests to the leader TMA for as long as the leader TMA is so designated and for as long as the dual-mode vehicle hosting the processing system continues to operate with the traffic zone (or may continue to receive navigation instructions even in the absence of specifically requesting to take navigation actions at optional step 325). In one example, the method 300 may be expanded to include requesting to land in the traffic zone and may include submitting the request to the leader TMA, the second leader TMA, and or directly to a local controller, receiving an authorization to land, and displaying the route to land via an AR display and/or holographic display, or automatically executing one or more actions/operations/maneuvers in order to land the dual-mode vehicle. In various other examples, the method 300 may further include or may be modified to comprise aspects of any of the above-described examples in connection with FIGS. 1 and 2, the following example(s) of FIG. 4, or as otherwise described in the present disclosure. Thus, these and other modifications are all contemplated within the scope of the present disclosure.

FIG. 4 illustrates a flowchart of an example method 400 for obtaining via a traffic management application of a dual-mode vehicle a navigation instruction from a leader traffic management application and performing at least one of: executing a navigation action or displaying at least a portion of a permitted route that is in conformance with the navigation instruction. In one example, steps, functions and/or operations of the method 400 may be performed by a device and/or processing system as illustrated in FIG. 1, e.g., by one of dual-mode vehicles 161-164, or any one or more components thereof, such as an OBU and/or a TPM, etc., or by one of the dual-mode vehicles 161-164 and/or any one or more components thereof in conjunction with one or more other components of the system 100, such as local controller 167 and/or local controller 168, one or more of server(s) 112, elements of wireless access network 115, telecommunication network 110, and so forth. In one example, the steps, functions, or operations of method 400 may be performed by a computing device or processing system, such as computing system 500 and/or hardware processor element 502 as described in connection with FIG. 5 below. For instance, the computing system 500 may represent any one or more components of the system 100 that is/are configured to perform the steps, functions and/or operations of the method 400. Similarly, in one example, the steps, functions, or operations of the method 400 may be performed by a processing system comprising one or more computing devices collectively configured to perform various steps, functions, and/or operations of the method 400. For instance, multiple instances of the computing system 500 may collectively function as a processing system. For illustrative purposes, the method 400 is described in greater detail below in connection with an example performed by a processing system. The method 400 begins in step 405 and proceeds to step 410.

At step 410, the processing system (e.g., of a dual-mode vehicle including at least one processor executing a traffic management application (TMA)) detects a proximity to a traffic zone for vehicular traffic. For example, step 410 may comprise the same or similar operations as described above in connection with step 310 of the example method 300.

At step 420, the processing system verifies, e.g., via the TMA, a rule set for vehicular operations within the traffic zone, e.g., including dual-mode vehicular operations. For example, step 420 may comprise the same or similar operations as described above in connection with step 315 of the example method 300.

At step 430, the processing system identifies, e.g., via the TMA, that the TMA of the dual-mode vehicle is designated as a leader TMA from among a plurality of TMA of a plurality of dual-mode vehicles within or near the traffic zone. For instance, step 430 may comprise the same or similar operations as described above in connection with step 320 of the example method 300. However, in this case, the result of the collective scoring/voting may be that the TMA of the dual-mode vehicle hosting the processing system performing the method 400 is actually the one that is designated as the leader TMA. In one example, if there is only one dual-mode vehicle in the zone, then that lone dual-mode vehicle is designated the leader TMA.

At optional step 440, the processing system may obtain, e.g., via the TMA, at least one navigation request from at least one TMA of at least one other dual-mode vehicle, e.g., where the request is on behalf of the at least one other dual-mode vehicle (and/or of an operator thereof).

At step 450, the processing system identifies, e.g., via the TMA, at least one navigation instruction for at least one other dual-mode vehicle of the plurality of dual-mode vehicles. In one example, the at least one navigation instruction may be identified in response to the request that may be received at optional step 440. In one example, step 450 may include selecting the at least one navigation instruction in accordance with the rule set for vehicular operations within the traffic zone. In another example, step 450 may include obtaining an instruction from a local controller, e.g., with respect to a take-off or landing operation of a second dual-mode vehicle, identifying at least a third dual-mode vehicle having an intended path or apparent navigation path that may conflict with the take-off or landing operation, and selecting/identifying at least one navigation instruction for the at least the third dual-mode vehicle, e.g., to reroute the at least the third dual-mode vehicle, to cause the at least the third dual-mode vehicle to hold a position, or the like.

At step 460, the processing system transmits, e.g., via the TMA, the at least one navigation instruction to at least one other TMA of the at least one other dual-mode vehicle. In one example, the at least one navigation instruction is transmitted in response to the at least one navigation request that may be received at optional step 440. It should be noted that in one example, the at least one other TMA may forward the at least one navigation instruction to an on-board unit (OBU) of the at least one other dual-mode vehicle for at least one of: (1) executing a navigation action in accordance with the at least one navigation instruction or (2) displaying at least a portion of a permitted route that is in conformance with the at least one navigation instruction, such as described above in connection with step 335 and/or optional step 360 of the example method 300.

At optional step 470, the processing system may obtain, e.g., via the TMA, a navigation request from an on-board unit (OBU) of the dual-mode vehicle. For instance as noted above, the leader TMA may further address navigation requests and give navigation instructions to the dual-mode vehicle that hosts the leader TMA, but without favor or bias toward the host dual-mode vehicle. The navigation request may be of the same or similar nature as those described above, such as a request to change altitude, change bearing or speed, change an intended destination or intended navigation/flight path, and so forth.

At optional step 480, the processing system may determine, e.g., via the TMA, at least a second navigation instruction, where the at least the second navigation instruction is for the dual-mode vehicle. In one example, the at least the second navigation instruction may be identified in response to the request that may be received at optional step 470. In one example, optional step 480 may comprise the same or similar operations as described above in connection with step 450. For instance, as noted above, the leader TMA may further address navigation requests and give navigation instructions to the dual-mode vehicle that hosts the leader TMA, but without favor or bias toward the host dual-mode vehicle. In this regard, it should also be noted that in one example, the at least one second navigation instruction may be determined in the absence of a requested being received at optional step 470. For example, the TMA, as the leader TMA, may determine that the dual-mode vehicle should reroute, hold a position, or the like, e.g., in order to accommodate the navigation paths and/or operations/actions/maneuvers of other dual-mode vehicles, such as giving way to first responder dual-mode vehicles, accommodating take-off and landing operations of other dual-mode vehicles, etc.

At optional step 490, the processing system may perform at least one of: (1) executing at least one navigation action in accordance with the at least the second navigation instruction, or (2) displaying at least a portion of a permitted route in conformance with the at least the second navigation instruction. In one example, the processing system may forward, via the TMA, the at least the second navigation instruction to an on-board unit (OBU) of the dual-mode vehicle, where the processing system may include the OBU, and where optional step 490 may be performed via the OBU. In one example, optional step 490 may comprise the same or similar operations as step 350 of the example method 300.

Following step 460 or any of optional steps 470-490, the method 400 may proceed to step 495. At step 495, the method 400 ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400, such as steps 450 and 460 for additional dual-mode vehicles, for additional operations of a same dual-mode vehicle, and so forth. In one example, the method 400 may be expanded to include communicating with a local controller, such as for receiving authorization to land or take-off, forwarding requests to land or to take-off from other dual-mode vehicles, and so forth. In various other examples, the method 400 may further include or may be modified to comprise aspects of any of the above-described examples in connection with FIGS. 1-3, or as otherwise described in the present disclosure. Thus, these and other modifications are all contemplated within the scope of the present disclosure.

Accordingly, in one example, the present disclosure may include a method, non-transitory computer-readable medium, or apparatus comprising a processing system of a dual-mode vehicle including at least one processor executing a traffic management application, detecting a proximity to a traffic zone for vehicular traffic, the dual-mode vehicle having two modes of operation, where the two modes of operation comprise a surface mode of operation and an aerial mode of operation, verifying a rule set for vehicular operations within the traffic zone, identifying that the traffic management application of the dual-mode vehicle is designated as a leader traffic management application from among a plurality of traffic management applications of a plurality of dual-mode vehicles within or near the traffic zone, identifying at least one navigation instruction for at least one other dual-mode vehicle of the plurality of dual-mode vehicles, and transmitting the at least one navigation instruction to at least one other traffic management application of the at least one other dual-mode vehicle.

In one example, the processing system may further obtain, e.g., via the traffic management application, at least one navigation request from the at least one other traffic management application of the at least one other dual-mode vehicle, where the at least one navigation instruction may be transmitted in response to the at least one navigation request. In one example, the at least one navigation request may be on behalf of the at least one other dual-mode vehicle. In one example, the at least one other traffic management application may forward the at least one navigation instruction to an on-board unit of the at least one other dual-mode vehicle for at least one of: executing a navigation action in accordance with the at least one navigation instruction, or displaying at least a portion of a permitted route that is in conformance with the at least one navigation instruction. In one example, the identifying that the traffic management application of the dual-mode vehicle is designated as the leader traffic management application may comprise: providing first vehicular information regarding the dual-mode vehicle to others of the plurality of traffic management applications, receiving, from the others of the plurality of traffic management applications, second vehicular information regarding others of the plurality of dual-mode vehicles, providing, to the others of the plurality of traffic management applications, first scores of the plurality of traffic management applications, and receiving, from the others of the plurality of traffic management applications, second scores of the plurality of traffic management applications. In one example, the identifying that the traffic management application of the dual-mode vehicle is designated as the leader traffic management application may further comprise: adding the first scores to the second scores to obtain combined scores for each of the plurality of traffic management applications, where the traffic management application of the dual-mode vehicle may be designated as the leader traffic management by having a highest combined score.

In addition, in one example, the identifying that the traffic management application of the dual-mode vehicle is designated as the leader traffic management application may further comprise: calculating the first scores according to a set of ranking criteria, where the set of ranking criteria may include at least one criteria. For example, the at least one criteria may comprise: ranking traffic management applications in an order of priority, where the order of priority ranks emergency service dual-mode vehicles higher than persistent dual-mode vehicles, and where persistent dual-mode vehicles are ranked higher than transient dual-mode vehicles, and where transient dual-mode vehicles comprising autonomous dual-mode vehicles are ranked higher than transient dual-mode vehicles that are human-operated and/or ranking the plurality of traffic management applications based upon intended durations of remaining within the traffic zone. In one example, the intended durations may be included in the second vehicular information.

In one example, the processing system may further determine at least a second navigation instruction, where the at least the second navigation instruction is for the dual-mode vehicle, and may perform at least one of: executing at least one navigation action in accordance with the at least the second navigation instruction, or displaying at least a portion of a permitted route that is in conformance with the at least the second navigation instruction. In one example, the processing system may forward, e.g., via the traffic management application, the at least the second navigation instruction to an on-board unit of the dual-mode vehicle, where the processing system includes the on-board unit. In one example, the processing system may obtain a navigation request from an on-board unit of the dual-mode vehicle, where the at least the second navigation instruction is determined and forwarded to the on-board unit in response to the navigation request. In one example, the method may comprise the displaying of the at least the portion of the permitted route that is in conformance with the at least one navigation instruction, where the displaying may comprise: displaying the at least the portion of the permitted route as a path in a three dimensional space representing the traffic zone. In one example, the displaying may be via a holographic display of a headset of an operator of the dual-mode vehicle, or via an integrated holographic display of the dual-mode vehicle. In one example, the displaying may comprise displaying at least one intended route of at least one other dual-mode vehicle of the plurality of dual-mode vehicles. In addition, in one example, the at least the portion of the permitted route may be presented in a first color and the at least one intended route of the at least one other dual-mode vehicle may be presented in at least a second color.

In one example, the rule set for vehicular operations within the traffic zone may be obtained from a local traffic controller of the traffic zone. For instance, in one example, the local traffic controller may manage surface-operating traffic within the traffic zone, and may further manage take-off and landing operations of dual-mode vehicles within the traffic zone. In one example, the processing system may (1) receive a notification from a local traffic controller of a take-off operator or a landing operation and (2) at least one of: (a) changing/revoking at least one previous navigation instruction in response to the notification, or (b) selecting at least one new navigation instruction for at least one of the plurality of dual-mode vehicles in response to the notifications, or (c) where the notification comprises at least one instruction from the local traffic controller, and where the method may further includes forwarding the at least one instruction. In addition, in one example, the at least one navigation instruction may be selected in accordance with the rule set for vehicular operations within the traffic zone.

In addition, although not expressly specified above, one or more steps of the method 300 or the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIGS. 3 and 4 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 5 depicts a high-level block diagram of a computing system 500 (e.g., a computing device or processing system) specifically programmed to perform the functions described herein. For example, any one or more components, devices, and/or systems illustrated in FIG. 1, or described in connection with the examples of FIGS. 2-4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for identifying that a traffic management application of a dual-mode vehicle is designated as a leader traffic management application within or near a traffic zone and transmitting via the traffic management application of the dual-mode vehicle a navigation instruction to at least one other traffic management application of at least one other dual-mode vehicle and/or for obtaining via a traffic management application of a dual-mode vehicle a navigation instruction from a leader traffic management application and performing at least one of executing a navigation action or displaying at least a portion of a permitted route that is in conformance with the navigation instruction, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 505 for identifying that a traffic management application of a dual-mode vehicle is designated as a leader traffic management application within or near a traffic zone and transmitting via the traffic management application of the dual-mode vehicle a navigation instruction to at least one other traffic management application of at least one other dual-mode vehicle and/or for obtaining via a traffic management application of a dual-mode vehicle a navigation instruction from a leader traffic management application and performing at least one of executing a navigation action or displaying at least a portion of a permitted route that is in conformance with the navigation instruction (e.g., a software program comprising computer-executable instructions) can be loaded into memory 504 and executed by hardware processor element 502 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the present module 505 for identifying that a traffic management application of a dual-mode vehicle is designated as a leader traffic management application within or near a traffic zone and transmitting via the traffic management application of the dual-mode vehicle a navigation instruction to at least one other traffic management application of at least one other dual-mode vehicle and/or for obtaining via a traffic management application of a dual-mode vehicle a navigation instruction from a leader traffic management application and performing at least one of executing a navigation action or displaying at least a portion of a permitted route that is in conformance with the navigation instruction (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
detecting, by a processing system of a dual-mode vehicle including at least one processor executing a traffic management application, a proximity to a traffic zone for vehicular traffic, the dual-mode vehicle having two modes of operation, wherein the two modes of operation comprise a surface mode of operation and an aerial mode of operation;
verifying, by the processing system via the traffic management application, a rule set for vehicular operations within the traffic zone, wherein the rule set for vehicular operations within the traffic zone is obtained from a local controller of the traffic zone, wherein the local controller comprises a controller of a plurality of traffic signals for surface-based vehicular operations, and wherein the rule set for vehicular operations within the traffic zone includes rules for aerial vehicular operations within the traffic zone;
identifying, by the processing system via the traffic management application, a leader traffic management application from among a plurality of traffic management applications of a plurality of dual-mode vehicles within or near the traffic zone, wherein the plurality of dual-mode vehicles includes the dual-mode vehicle, and wherein the identifying of the leader traffic management application is based upon the rule set;
obtaining, by the processing system via the traffic management application, at least one aerial navigation instruction from the leader traffic management application, wherein the local controller manages surface-operating traffic within the traffic zone via the plurality of traffic signals, and wherein the leader traffic management application manages aerial traffic within the traffic zone; and
performing, by the processing system, at least one of:
executing an aerial navigation action in accordance with the at least one aerial navigation instruction; or
displaying at least a portion of a permitted route that is in conformance with the at least one aerial navigation instruction, wherein the performing comprises forwarding the at least one aerial navigation instruction to an on-board unit of the dual-mode vehicle via the traffic management application, wherein the on-board unit comprises:
a display of the dual-mode vehicle; or
an autonomous navigation module of the dual-mode vehicle.

2. The method of claim 1, wherein the identifying the leader traffic management application comprises:
providing first vehicular information regarding the dual-mode vehicle to others of the plurality of traffic management applications;
receiving, from the others of the plurality of traffic management applications, second vehicular information regarding others of the plurality of dual-mode vehicles;
providing, to the others of the plurality of traffic management applications, first scores for the plurality of traffic management applications; and
receiving, from the others of the plurality of traffic management applications, second scores for the plurality of traffic management applications.

3. The method of claim 2, wherein the identifying the leader traffic management application further comprising:
adding the first scores to the second scores to obtain combined scores for each of the plurality of traffic management applications, wherein the leader traffic management application is identified as a traffic management application from among the plurality of traffic management applications having a highest combined score.

4. The method of claim 2, wherein the identifying the leader traffic management application further comprises:
calculating the first scores according to a set of ranking criteria, wherein the set of ranking criteria includes at least one criterion.

5. The method of claim 4, wherein the set of ranking criteria is received as part of or accompanying the rule set for vehicular operations within the traffic zone.

6. The method of claim 4, wherein the at least one criterion comprises:

ranking traffic management applications in an order of priority, wherein the order of priority ranks an emergency service dual-mode vehicle higher than a persistent dual-mode vehicle, wherein the persistent dual-mode vehicle is ranked higher than a transient dual-mode vehicle, and wherein the transient dual-mode vehicle comprising an autonomous dual-mode vehicle is ranked higher than a transient dual-mode vehicle that is human-operated.

7. The method of claim 6, wherein the at least one criterion further comprises:

ranking the plurality of traffic management applications based upon intended durations of remaining time within the traffic zone, wherein the intended durations are included in the second vehicular information.

8. The method of claim 4, further comprising:

obtaining, by the processing system via the traffic management application, an indication that the leader traffic management application is anticipated to leave the traffic zone; and identifying, by the processing system via the traffic management application, a second leader traffic management application from among the plurality of traffic management applications of the plurality of dual-mode vehicles within or near the traffic zone.

9. The method of claim 8, further comprising:

obtaining, by the processing system via the traffic management application, at least one additional navigation instruction from the second leader traffic management application; and performing, by the processing system, at least one of:

executing a second navigation action in accordance with the at least one additional navigation instruction; or displaying at least a second portion of the permitted route or of a second permitted route that is in conformance with the at least one additional navigation instruction.

10. The method of claim 1, wherein the method comprises the displaying of the at least the portion of the permitted route that is in conformance with the at least one aerial navigation instruction, wherein the displaying comprises:

displaying the at least the portion of the permitted route as a path in a three dimensional space representing the traffic zone.

11. The method of claim 10, wherein the displaying is further via a holographic display of a headset of an operator of the dual-mode vehicle, or via an integrated holographic display of the dual-mode vehicle.

12. The method of claim 10, wherein the displaying comprises:

displaying at least one intended route of at least one other dual-mode vehicle of the plurality of dual-mode vehicles.

13. The method of claim 12, wherein the at least the portion of the permitted route is presented in a first color, and wherein the at least one intended route of the at least one other dual-mode vehicle is presented in at least a second color.

14. The method of claim 1, wherein the local controller manages takeoff operations and landing operations of dual-mode vehicles within the traffic zone.

15. The method of claim 14, wherein the local controller further manages surface-operating traffic within the traffic zone.

16. The method of claim 1, wherein the at least one aerial navigation instruction is selected in accordance with the rule set for vehicular operations within the traffic zone.

17. A non-transitory computer-readable medium storing instructions which, when executed by a processing system of a dual-mode vehicle including at least one processor, cause the processing system to perform operations of at least a traffic management application, the operations comprising:

detecting a proximity to a traffic zone for vehicular traffic, the dual-mode vehicle having two modes of operation, wherein the two modes of operation comprise a surface mode of operation and an aerial mode of operation;

verifying a rule set for vehicular operations within the traffic zone, wherein the rule set for vehicular operations within the traffic zone is obtained from a local controller of the traffic zone, wherein the local controller comprises a controller of a plurality of traffic signals for surface-based vehicular operations, wherein the rule set for vehicular operations within the traffic zone includes rules for aerial vehicular operations within the traffic zone;

identifying a leader traffic management application from among a plurality of traffic management applications of a plurality of dual-mode vehicles within or near the traffic zone, wherein the plurality of dual-mode vehicles includes the dual-mode vehicle, wherein the identifying of the leader traffic management application is based upon the rule set;

obtaining at least one aerial navigation instruction from the leader traffic management application, wherein the local controller manages surface-operating traffic within the traffic zone via the plurality of traffic signals, and wherein the leader traffic management application manages aerial traffic within the traffic zone; and performing at least one of:

executing a navigation action in accordance with the at least one aerial navigation instruction; or displaying at least a portion of a permitted route that is in conformance with the at least one aerial navigation instruction, wherein the performing comprises forwarding the at least one aerial navigation instruction to an on-board unit of the dual-mode vehicle via the traffic management application, wherein the on-board unit comprises:

a display of the dual-mode vehicle; or an autonomous navigation module of the dual-mode vehicle.

18. An apparatus comprising:

a processing system of a dual-mode vehicle including at least one processor; and a computer-readable medium storing instructions which, when executed by the processing system, cause the processing system to perform operations of at least a traffic management application, the operations comprising:

detecting a proximity to a traffic zone for vehicular traffic, the dual-mode vehicle having two modes of operation, wherein the two modes of operation comprise a surface mode of operation and an aerial mode of operation;

verifying a rule set for vehicular operations within the traffic zone, wherein the rule set for vehicular operations within the traffic zone is obtained from a local controller of the traffic zone, wherein the local controller comprises a controller of a plurality of traffic signals for surface-based vehicular operations, wherein the rule set for vehicular operations within the traffic zone includes rules for aerial vehicular operations within the traffic zone;

identifying a leader traffic management application from among a plurality of traffic management applications of a plurality of dual-mode vehicles within or near the traffic zone, wherein the plurality of dual-mode vehicles includes the dual-mode vehicle, wherein the identifying of the leader traffic management application is based upon the rule set;

obtaining at least one aerial navigation instruction from the leader traffic management application, wherein the local controller manages surface-operating traffic within the traffic zone via the plurality of traffic signals, and wherein the leader traffic management application manages aerial traffic within the traffic zone; and performing at least one of:

executing a navigation action in accordance with the at least one aerial navigation instruction; or displaying at least a portion of a permitted route that is in conformance with the at least one aerial navigation instruction, wherein the performing comprises forwarding the at least one aerial navigation instruction to an on-board unit of the dual-mode vehicle via the traffic management application, wherein the on-board unit comprises:

a display of the dual-mode vehicle; or an autonomous navigation module of the dual-mode vehicle.

19. The apparatus of claim 18, wherein the identifying the leader traffic management application comprises:

providing first vehicular information regarding the dual-mode vehicle to others of the plurality of traffic management applications;

receiving, from the others of the plurality of traffic management applications, second vehicular information regarding others of the plurality of dual-mode vehicles;

providing, to the others of the plurality of traffic management applications, first scores for the plurality of traffic management applications; and receiving, from the others of the plurality of traffic management applications, second scores for the plurality of traffic management applications.

20. The apparatus of claim 19, wherein the identifying the leader traffic management application further comprising:

adding the first scores to the second scores to obtain combined scores for each of the plurality of traffic management applications, wherein the leader traffic management application is identified as a traffic management application from among the plurality of traffic management applications having a highest combined score.

* * * * *